US009437081B2

(12) United States Patent
Hoffman et al.

(10) Patent No.: US 9,437,081 B2
(45) Date of Patent: Sep. 6, 2016

(54) GAMING SYSTEM AND METHOD FOR PROVIDING A COMMUNITY BONUS EVENT

(71) Applicant: IGT, Las Vegas, NV (US)

(72) Inventors: Benjamin C. Hoffman, Reno, NV (US); Paulina Rodgers, Reno, NV (US); Christmas C. Parker, Reno, NV (US); Brian J. Book, Reno, NV (US); Jason D. Kremer, Reno, NV (US)

(73) Assignee: IGT, Las Vegas, NV (US)

(*) Notice: Subject to any disclaimer, the term of this patent is extended or adjusted under 35 U.S.C. 154(b) by 113 days.

(21) Appl. No.: 14/449,626

(22) Filed: Aug. 1, 2014

(65) Prior Publication Data

US 2014/0342815 A1 Nov. 20, 2014

Related U.S. Application Data

(60) Continuation of application No. 13/773,289, filed on Feb. 21, 2013, now Pat. No. 8,795,057, which is a division of application No. 12/270,347, filed on Nov. 13, 2008, now Pat. No. 8,382,572.

(51) Int. Cl.

| | |
|---|---|
| ***A63F 9/24*** | (2006.01) |
| ***A63F 13/00*** | (2014.01) |
| ***G06F 17/00*** | (2006.01) |

(Continued)

(52) U.S. Cl.

CPC ........... *G07F 17/3288* (2013.01); *G07F 17/32* (2013.01); *G07F 17/3237* (2013.01); *G07F 17/3244* (2013.01); *G07F 17/3267* (2013.01); *G07F 17/3272* (2013.01); *G07F 17/3276* (2013.01); *G07F 17/3239* (2013.01)

(58) Field of Classification Search

CPC ............... G07F 17/3288; G07F 17/32; G07F 17/3237; G07F 17/3244; G07F 17/3267; G07F 17/3272; G07F 17/3276; G07F 17/3239

See application file for complete search history.

(56) References Cited

U.S. PATENT DOCUMENTS

| | | | |
|---|---|---|---|
| 5,560,603 | A | 10/1996 | Seelig et al. |
| 5,564,700 | A | 10/1996 | Celona |
| 5,584,763 | A | 12/1996 | Kelly et al. |

(Continued)

FOREIGN PATENT DOCUMENTS

| | | |
|---|---|---|
| GB | 2 191 030 | 12/1987 |
| GB | 2 242 300 | 9/1991 |

(Continued)

OTHER PUBLICATIONS

Indiana Jones Slots Attract Modern 'Raiders', published in the Atlantic City Press on Jul. 27, 2008.

*Primary Examiner* — Kevin Y Kim

(74) *Attorney, Agent, or Firm* — Neal, Gerber & Eisenberg LLP

(57) ABSTRACT

A gaming system and method including providing a community or group bonus event to a plurality of players at a plurality of gaming devices. For each of the players determined as eligible to participate in a triggered group bonus event, the gaming system determines that player's relative probability of winning a group bonus event award in the triggered bonus event. In one such embodiment, each player's relative probability of winning the group bonus event award is based on that player's wagering history, such as any amounts wagered by that player, the frequency of placing such wagers and/or frequency of not placing any wagers.

20 Claims, 10 Drawing Sheets

(51) Int. Cl.
*G06F 19/00* (2011.01)
*G07F 17/32* (2006.01)

(56) References Cited

U.S. PATENT DOCUMENTS

| | | | |
|---|---|---|---|
| 5,766,076 | A | 6/1998 | Pease et al. |
| 5,820,459 | A | 10/1998 | Acres et al. |
| 5,855,515 | A | 1/1999 | Pease et al. |
| 5,868,618 | A | 2/1999 | Netley et al. |
| 5,885,158 | A | 3/1999 | Torango et al. |
| 6,050,895 | A | 4/2000 | Luciano, Jr. et al. |
| 6,077,162 | A | 6/2000 | Weiss |
| 6,089,980 | A | 7/2000 | Gauselmann |
| 6,231,445 | B1 | 5/2001 | Acres |
| 6,319,125 | B1 | 11/2001 | Acres |
| 6,328,649 | B1 | 12/2001 | Randall et al. |
| 6,406,369 | B1 | 6/2002 | Baerlocher et al. |
| 6,413,160 | B1 | 7/2002 | Vancura |
| 6,425,824 | B1 | 7/2002 | Baerlocher et al. |
| 6,599,193 | B2 | 7/2003 | Baerlocher |
| 6,688,975 | B2 | 2/2004 | Baerlocher et al. |
| 6,712,697 | B2 | 3/2004 | Acres |
| 6,722,983 | B2 | 4/2004 | Kaminkow et al. |
| 6,793,575 | B2 | 9/2004 | Brown et al. |
| 6,796,899 | B2 | 9/2004 | Baerlocher |
| 6,837,793 | B2 | 1/2005 | McClintic |
| 6,840,856 | B2 | 1/2005 | Stern |
| 6,902,478 | B2 | 6/2005 | McClintic |
| 6,955,600 | B2 | 10/2005 | Glavich et al. |
| 6,966,834 | B1 | 11/2005 | Johnson |
| 7,056,215 | B1 | 6/2006 | Olive |
| 7,077,744 | B2 | 7/2006 | Cannon |
| 7,201,657 | B2 | 4/2007 | Baerlocher et al. |
| 7,235,011 | B2 | 6/2007 | Randall et al. |
| 7,238,110 | B2 | 7/2007 | Glavich et al. |
| 7,311,598 | B2 | 12/2007 | Kaminkow |
| 7,311,604 | B2 | 12/2007 | Kaminkow |
| 7,314,408 | B2 | 1/2008 | Cannon |
| 7,326,115 | B2 | 2/2008 | Baerlocher |
| 7,351,140 | B2 | 4/2008 | Wolf |
| 7,357,714 | B2 | 4/2008 | Tessmer et al. |
| 7,357,716 | B2 | 4/2008 | Marks |
| 7,393,280 | B2 | 7/2008 | Cannon |
| 7,427,236 | B2 | 9/2008 | Kaminkow |
| 7,429,215 | B2 | 9/2008 | Rozkin et al. |
| 7,448,949 | B2 | 11/2008 | Kaminkow |
| 7,473,174 | B2 | 1/2009 | Cuddy et al. |
| 8,092,302 | B2 | 1/2012 | Cuddy et al. |
| 2002/0142816 | A1 | 10/2002 | Stronach |
| 2002/0160825 | A1 | 10/2002 | Nicastro et al. |
| 2003/0186733 | A1 | 10/2003 | Wolf et al. |
| 2003/0216166 | A1 | 11/2003 | Baerlocher |
| 2004/0048644 | A1 | 3/2004 | Gerrard |
| 2004/0176156 | A1 | 9/2004 | Walker et al. |
| 2005/0239542 | A1 | 10/2005 | Olsen |
| 2006/0009283 | A1 | 1/2006 | Englman |
| 2006/0025195 | A1 | 2/2006 | Pennington |
| 2006/0030403 | A1 | 2/2006 | Lafky |
| 2006/0040732 | A1 | 2/2006 | Baerlocher |
| 2006/0040733 | A1 | 2/2006 | Baerlocher |
| 2006/0040734 | A1 | 2/2006 | Baerlocher |
| 2006/0040736 | A1* | 2/2006 | Baerlocher ............ G07F 17/32 463/27 |
| 2006/0121971 | A1 | 6/2006 | Slomiany |
| 2006/0135243 | A1 | 6/2006 | Englman |
| 2006/0183535 | A1 | 8/2006 | Marks |
| 2006/0281509 | A1 | 12/2006 | Arias-Vargas et al. |
| 2006/0287043 | A1 | 12/2006 | Englman et al. |
| 2007/0054732 | A1 | 3/2007 | Baerlocher |
| 2007/0054733 | A1 | 3/2007 | Baerlocher |
| 2007/0060271 | A1 | 3/2007 | Cregan |
| 2007/0060314 | A1 | 3/2007 | Baerlocher |
| 2007/0060321 | A1 | 3/2007 | Vasquez |
| 2007/0060330 | A1 | 3/2007 | Martin |
| 2007/0060369 | A1 | 3/2007 | Martin |
| 2007/0077990 | A1 | 4/2007 | Cuddy |
| 2007/0105619 | A1 | 5/2007 | Kniesteadt |
| 2007/0105620 | A1 | 5/2007 | Cuddy |
| 2007/0149292 | A1 | 6/2007 | Kaminkow |
| 2007/0155485 | A1 | 7/2007 | Cuddy |
| 2007/0167217 | A1 | 7/2007 | Kaminkow |
| 2007/0184887 | A1 | 8/2007 | Cannon |
| 2007/0191088 | A1 | 8/2007 | Breckner |
| 2007/0218975 | A1 | 9/2007 | Iddings |
| 2007/0218982 | A1 | 9/2007 | Baerlocher |
| 2007/0298874 | A1 | 12/2007 | Baerlocher |
| 2007/0298875 | A1 | 12/2007 | Baerlocher |
| 2008/0020817 | A1 | 1/2008 | Kaminkow |
| 2008/0020822 | A1 | 1/2008 | Cuddy |
| 2008/0020823 | A1 | 1/2008 | Cuddy |
| 2008/0020824 | A1 | 1/2008 | Cuddy |
| 2008/0020825 | A1 | 1/2008 | Cuddy |
| 2008/0020829 | A1 | 1/2008 | Baerlocher |
| 2008/0020832 | A1 | 1/2008 | Iddings |
| 2008/0020833 | A1 | 1/2008 | Baerlocher |
| 2008/0020834 | A1 | 1/2008 | Breckner |
| 2008/0020846 | A1 | 1/2008 | Vasquez |
| 2008/0020847 | A1 | 1/2008 | Kniesteadt |
| 2008/0039191 | A1 | 2/2008 | Cuddy |
| 2008/0045341 | A1 | 2/2008 | Englman |
| 2008/0051168 | A1 | 2/2008 | Kaminkow |
| 2008/0070676 | A1 | 3/2008 | Baerlocher |
| 2008/0070677 | A1 | 3/2008 | Baerlocher |
| 2008/0070678 | A1 | 3/2008 | Baerlocher |
| 2008/0070702 | A1 | 3/2008 | Kaminkow |
| 2008/0076514 | A1 | 3/2008 | Baerlocher |
| 2008/0076515 | A1 | 3/2008 | Baerlocher |
| 2008/0076517 | A1 | 3/2008 | Baerlocher |
| 2008/0076532 | A1 | 3/2008 | Graham |
| 2008/0076542 | A1 | 3/2008 | Baerlocher |
| 2008/0076552 | A1 | 3/2008 | Baerlocher |
| 2008/0081690 | A1 | 4/2008 | Baerlocher |
| 2008/0081691 | A1 | 4/2008 | Baerlocher |
| 2008/0090651 | A1 | 4/2008 | Baerlocher |
| 2008/0102920 | A1 | 5/2008 | Baerlocher |
| 2008/0102927 | A1 | 5/2008 | Mayeroff |
| 2008/0108401 | A1 | 5/2008 | Baerlocher |
| 2008/0108410 | A1 | 5/2008 | Baerlocher |
| 2008/0108423 | A1 | 5/2008 | Benbrahim |
| 2008/0108429 | A1 | 5/2008 | Davis |
| 2008/0108430 | A1 | 5/2008 | Evans |
| 2008/0108431 | A1 | 5/2008 | Cuddy |
| 2008/0113765 | A1 | 5/2008 | DeWaal |
| 2008/0113768 | A1 | 5/2008 | Baerlocher |
| 2008/0113771 | A1 | 5/2008 | Baerlocher |
| 2008/0113779 | A1 | 5/2008 | Cregan |
| 2008/0119283 | A1 | 5/2008 | Baerlocher |
| 2008/0139274 | A1 | 6/2008 | Baerlocher |
| 2008/0153564 | A1 | 6/2008 | Baerlocher |
| 2008/0160825 | A1 | 7/2008 | Polnyi |
| 2008/0176630 | A1 | 7/2008 | Toyoda |
| 2008/0207298 | A1 | 8/2008 | Marks |
| 2009/0042641 | A1* | 2/2009 | Anderson ........... G07F 17/3269 463/25 |
| 2010/0120503 | A1 | 5/2010 | Hoffman et al. |
| 2010/0234094 | A1 | 9/2010 | Gagner et al. |

FOREIGN PATENT DOCUMENTS

| | | |
|---|---|---|
| GB | 2 262 642 | 6/1993 |
| WO | WO 96/25725 | 8/1996 |
| WO | WO 98/00210 | 1/1998 |
| WO | WO 98/51384 | 11/1998 |
| WO | WO 00/32286 | 6/2000 |
| WO | WO 2006/044252 | 4/2006 |
| WO | WO 2007/028108 | 3/2007 |
| WO | WO 2007/030733 | 3/2007 |
| WO | WO 2008/002387 | 1/2008 |
| WO | WO 2008/048634 | 4/2008 |
| WO | WO 2008/133849 | 6/2008 |

* cited by examiner

FIG. 5

| Player | Quantity of Accumulated Bonus Event Points | Probability of Winning Bonus Event Award |
|---|---|---|
| Player A | 2700 | 27% |
| Player B | 4300 | 43% |
| Player C | 300 | 3% |
| Player D | 1800 | 18% |
| Player E | 900 | 9% |

FIG. 9

| Player | Amount in Total Play Accumulated Wager Meter | Amount in Recent Play Accumulated Wager Meter | Applicable Multiplier | Probability of Winning Group Bonus Event Award |
|---|---|---|---|---|
| Player A | 1000 | 200 | 10X | 7% |
| Player B | 990 | 990 | 10X | 33% |
| Player C | 360 | 310 | 3X | 10% |
| Player D | 1550 | 650 | 15X | 22% |
| Player E | 1100 | 850 | 11X | 28% |

GAMING SYSTEM AND METHOD FOR PROVIDING A COMMUNITY BONUS EVENT

PRIORITY CLAIM

This application is a continuation of, claims priority to and the benefit of U.S. patent application Ser. No. 13/773,289, filed on Feb. 21, 2013, which is a divisional of, claims priority to and the benefit of U.S. patent application Ser. No. 12/270,347, filed on Nov. 13, 2008, now U.S. Pat. No. 8,382,572, the entire contents of which are each incorporated by reference herein.

COPYRIGHT NOTICE

A portion of the disclosure of this patent document contains or may contain material which is subject to copyright protection. The copyright owner has no objection to the photocopy reproduction by anyone of the patent document or the patent disclosure in exactly the form it appears in the Patent and Trademark Office patent file or records, but otherwise reserves all copyright rights whatsoever.

BACKGROUND

Gaming machines which provide players awards in primary or base games are well known. Gaming machines generally require the player to place or make a wager to activate the primary or base game. In many of these gaming machines, the award is based on the player obtaining a winning symbol or symbol combination and on the amount of the wager (e.g., the higher the wager, the higher the award). Symbols or symbol combinations which are less likely to occur usually provide higher awards.

In such known gaming machines, the amount of the wager made on the base game by the player may vary. For instance, the gaming machine may enable the player to wager a minimum number of credits, such as one credit (e.g., one cent, nickel, dime, quarter or dollar) up to a maximum number of credits, such as five credits. This wager may be made by the player a single time or multiple times in a single play of the primary game. For instance, a slot gaming machine may have one or more paylines and the slot gaming machine may enable the player to make a wager on each payline in a single play of the primary game. Thus, it is known that a gaming machine, such as a slot gaming machine, may enable players to make wagers of substantially different amounts on each play of the primary or base game ranging, for example, from one credit up to 125 credits (e.g., five credits on each of 25 separate paylines). This is also true for other wagering games, such as video draw poker, where players can wager one or more credits on each hand and where multiple hands can be played simultaneously. Accordingly, it should be appreciated that different players play at substantially different wagering amounts or levels and at substantially different rates of play.

Secondary or bonus games are also known in gaming machines. The secondary or bonus games usually provide an additional award to the player. Secondary or bonus games usually do not require an additional wager by the player to be activated. Secondary or bonus games are generally activated or triggered upon an occurrence of a designated triggering symbol or triggering symbol combination in the primary or base game. For instance, a bonus symbol occurring on the payline on the third reel of a three reel slot machine may trigger the secondary or bonus game. When a secondary or bonus game is triggered, the gaming machines generally indicates this to the player through one or more visual and/or audio output devices, such as the reels, lights, speakers, video screens, etc. Part of the enjoyment and excitement of playing certain gaming machines is the occurrence or triggering of the secondary or bonus game (even before the player knows how much the bonus award will be).

In recent years, gaming has become a more social leisure activity. Gaming establishments often strive for ways to enable players to work together in gaming. Working together creates camaraderie among the players and provides an enhanced gaming experience. Certain secondary or bonus games include a group gaming aspect wherein a plurality of players participate in a group bonus game for one or more bonus awards. Accordingly, there is a continuing need to provide new bonus games which include a group gaming aspect, wherein a plurality of players playing at linked gaming machines participate in a group bonus game for one or more bonus awards.

In one known system, determinations of which players at which gaming devices become eligible to participate in which group bonus games is based on which players are classified as actively playing gaming machines in the gaming system. A player is often classified as actively playing a gaming machine based on that player's level of game play (e.g., the amount and/or frequency of that player's wagers placed). In one known group gaming system, a plurality of players at a plurality of linked gaming machines each play one or more games. As each player plays such games, the player's gaming machine accumulates credits in a credit pool for that player. Such accumulated credits are used to determine the player's probability of winning each of a plurality of awards within a group bonus game and a multiplier that the player utilizes during a plurality of free spin of the group bonus game. In operation of this group gaming system, if a bonus game triggering event occurs and a player is classified as actively playing a gaming machine (i.e., the player has placed a wager on a game in the last fifteen seconds), that player is eligible to participate in the triggered group bonus game.

In such gaming systems, one or more players keep a level of game play at the minimum amount required to remain classified as actively playing a gaming machine. When this occurs, participation in the group bonus game often does not correspond with each player's level of game play. In other words, this can skew the participation and subsequent award distribution in group bonus games to such players that keep their level of game play at the minimum amount required to remain active. Accordingly, there is a need to provide a gaming system with a group bonus game that solves such problems.

SUMMARY

In one embodiment, the gaming system and method disclosed herein provides a community or group bonus event to a plurality of players at a plurality of gaming devices of the gaming system. For each of the players determined as eligible to participate in a triggered group bonus event, the gaming system determines that player's relative probability of winning a group bonus event award in the triggered bonus event. In one such embodiment, each player's relative probability of winning the group bonus event award is based on that player's wagering history for a designated period, such as any amounts wagered by that player during the designated period, the frequency of placing such wagers during the designated period and/or any amounts of time not placing any wagers during the designated period. Thus, the gaming system provides that a first player that is maintaining a first level of game play above a minimum amount required to remain eligible to participate in a triggered bonus event has a greater probability of winning a group bonus event award in the triggered bonus event than a second player that is maintaining a second, lower level of game play at the minimum amount required to remain eligible to participate in the triggered bonus event. The disclosed gaming system and method provide that each player's probability of winning a group bonus event award (in a triggered group bonus event) corresponds to that player's relative level of game play or wagering activity.

In one embodiment, the gaming system and method disclosed herein employs a multiple pool-based or multiple meter-based system to determine each individual player's probability to win a group bonus event award in a triggered bonus event. In one such embodiment, for each player (or each individual gaming device), the gaming system maintains a plurality of individual accumulated wager meters or pools. In this embodiment, for each player (or each individual gaming device) the gaming system maintains a first accumulated wager meter or pool (i.e., a total play meter or pool) which is utilized in a triggered bonus event to determine one factor or aspect of the bonus event provided for that player. The amount in this maintained first accumulated wager meter or pool is based on any amounts of wagers placed over a designated period of time. The gaming system also maintains, for each player (or each individual gaming device), a second accumulated wager meter or pool (i.e., a recent play meter or pool) which is utilized to determine another factor or aspect of the bonus event for that player. The amount in this maintained second accumulated wager meter generally reflects a player's rate of play.

In one embodiment, for each designated wager (e.g., a primary game wager, a side wager or a designated amount of such wagers) placed by a player at a gaming device, the gaming system increases or increments the first or total play accumulated wager meter and the second or recent play accumulated wager meter for that player (or for the gaming device currently played by that player). That is, each player (or each individual gaming device) is associated with a separate total play meter and a separate recent play meter, wherein each separate total play meter and each separate recent play meter is individually tracked or accounted for as a percentage of the total or partial amounts wagered by that player (or at that individual gaming device). For example, for each credit wagered by a player (i.e., each occurrence of an accumulated wager meter increment event), the gaming system increases the total play meter and the recent play meter for that player by one credit or unit to account for the credit wagered.

In this embodiment, the gaming system also decreases or reduces the amount in each player's (or each gaming device's) recent play accumulated wager meter at designated intervals. Accordingly, for each player, the gaming system may be increasing the amount in that player's maintained total play accumulated wager meter, increasing the amount in that player's maintained recent play accumulated wager meter and decreasing the amount in that player's maintained recent play accumulated wager meter based on different factors or aspects of the player's action, performance or other gaming experience.

In one embodiment, the gaming system utilizes the total play meter for a player to determine an applicable modifier or multiplier for that player for any triggered bonus event and further utilizes the recent play meter for the player to determine that player's probability of winning a group bonus event award for any triggered bonus event. In one such embodiment, upon an occurrence of a bonus event triggering condition, the gaming system determines an applicable modifier or multiplier for each player participating in the triggered bonus event. The applicable modifier for each player is determined based on the amount of accumulated credits in that player's total play accumulated wager meter, wherein the greater the player's total play meter, the greater the applicable modifier for that player for the triggered bonus event.

In this embodiment, the gaming system also determines, for each player, a relative probability of winning a group bonus event award for the triggered bonus event. The determined probability for each player is determined based on the current amount of accumulated credits in that player's recent play accumulated wager meter, wherein the greater the player's recent play meter, the greater that player's probability of winning a group bonus event award for the triggered bonus event.

After determining each player's applicable modifier and each player's relative probability of winning a group bonus event award in the triggered bonus event, the gaming system displays the triggered bonus event for each participating player, determines which player is provided the group bonus event award (based on the determined probabilities) and provides that player the group bonus event award. Accordingly, this embodiment provides that the gaming system maintains different recent play meters for different players that are wagering different amounts at different rates. Such different maintained recent play meters correspond to different probabilities of winning a group bonus event award proportional to each individual player's wagering activity for a designated period of time.

In another embodiment, the gaming system and method disclosed herein employs a point-based system to determine each individual player's probability to win a group bonus event award in a triggered group bonus event. The point-based system accounts for each individual player's wagering activity over a designated period of time to provide that each individual player's probability of winning a group bonus event award for a triggered group bonus event correlates to that individual player's wagering activity over the designated period of time. In this embodiment, each individual player's wagering activity over the designated period of time includes any amounts of wagers placed over the designated period of time and the frequency or rate of placing such wagers over the designated period of time.

In one embodiment, for each bonus event point accumulation event that occurs in association with a player (or a gaming device), the gaming system (i.e., a central server or one or more gaming devices) provides the player (or provides the player's currently played gaming device) a designated quantity of bonus event points. In one such embodiment, a bonus event point accumulation event occurs based on a player's wagers, wherein for each designated wager (e.g., a primary game wager, a side wager or a designated amount of such wagers) placed by a player at a gaming device, the gaming system provides the player (or provides the currently played gaming device) a designated quantity of bonus event points. For example, for each credit wagered by a player, the gaming system provides that player one bonus event point.

In one embodiment, for each bonus event point reduction event that occurs in association with a player (or a gaming device), the gaming system also reduces that player's (or that gaming device's) quantity of accumulated bonus event points. In one such embodiment, a bonus event point reduction event occurs and the gaming system reduces a player's (or a gaming device's) quantity of accumulated bonus event points at designated intervals. Accordingly, for each player, the central server may be increasing and decreasing the quantity of bonus event points based on different factors or aspects of the player's action, performance or other gaming experience.

In one embodiment, upon an occurrence of a bonus event triggering condition, the gaming system first determines which players (or gaming devices) qualify to participate in the triggered bonus event. In one such embodiment, the gaming system determines that each player with at least one accumulated bonus event point participates in the triggered bonus event. Thus, in this embodiment, each accumulated bonus event point represents a chance for a player to participate in a triggered group bonus event. For each player determined to participate in the triggered bonus event, the gaming system then determines, based on that player's current balance of bonus event points, a relative probability of winning a group bonus event award for the triggered bonus event. In this embodiment, the greater the balance of bonus event points for a player, the greater that player's probability of winning a group bonus event award for the triggered bonus event.

In one embodiment, the triggered bonus event is a competitive bonus event, wherein a player's balance of bonus event points correlates to an advantage to that player for the competitive bonus event. In one such embodiment, the triggered bonus event is a group race bonus event, wherein each player's relative balance of bonus event points correlates to that player's relative starting position in the group race bonus event. In another such embodiment, the triggered bonus event is a group accumulation bonus event, wherein each player's relative balance of bonus event points correlates to that player's relative starting accumulation value in the group accumulation bonus event. In this embodiment, a player with a higher starting accumulation value has a greater probability of being the first player to reach an accumulation value threshold and winning a group bonus event award. In these embodiments, a player's wagers placed and frequency of placing or not placing such wagers correlates to a player's balance of bonus event points which correlates to an advantage to that player for the competitive bonus event. Such configurations provide players a more visual and more intuitive bonus event since the player knows that if they accumulate and keep more bonus event points, they will be provided a tangible and easily ascertainable advantage in the bonus event. Accordingly, the gaming system disclosed herein provides increased excitement and anticipation as the player understands how any accumulated bonus event points provides the player an advantage in the triggered bonus event and thus players will be motivated to earn more bonus event points and earn greater advantages in the triggered bonus event.

After determining each player's relative probability of winning a group bonus event award in the triggered bonus event, the gaming system displays the triggered bonus event, determines which player is provided the group bonus event award and provides that player the group bonus event award. In one such embodiment, the triggered bonus event includes a plurality of group bonus event awards, such as progressive awards, wherein each group bonus event award is ranked or organized in a plurality of tiers or levels. In this embodiment, if a player is determined to win a group bonus event award, the group bonus event award provided to that player is based on that player's balance of bonus event points. In these embodiments, which player is provided the group bonus event award (and/or which group bonus event award is provided to that player) is based on that player's balance of bonus event points (which is based on that player's wagering activity). Accordingly, these embodiments provide that different players that are wagering different amounts at different rates maintain different balance of bonus event points and ultimately have different probabilities of winning a group bonus event award proportional to each individual player's wagering activity for a designated period of time. These embodiments further provide that different players that are wagering different amounts at different rates maintain different balance of bonus event points and may ultimately be provided different group bonus event awards proportional to each individual player's wagering activity for a designated period of time.

Additional features and advantages are described in, and will be apparent from, the following Detailed Description and the figures.

BRIEF DESCRIPTION OF THE FIGURES

FIG. 5 is a chart of one embodiment of the gaming system disclosed herein illustrating how each player's quantity of accumulated bonus event points corresponds to each player's relative probability of winning a bonus event award.

FIG. 9 is a chart of one embodiment of the gaming system disclosed herein illustrating how each player's total play accumulated wager meter corresponds to a multiplier for that player and how each player's recent play accumulated wager meter corresponds to that player's relative probability of winning a group bonus event award.

DETAILED DESCRIPTION

The present disclosure may be implemented in various configurations for gaming machines, gaming devices or gaming systems, including but not limited to: (1) a dedicated gaming machine, gaming device or gaming system wherein the computerized instructions for controlling any games (which are provided by the gaming machine or gaming device) are provided with the gaming machine or gaming device prior to delivery to a gaming establishment; and (2) a changeable gaming machine, gaming device or gaming system where the computerized instructions for controlling any games (which are provided by the gaming machine or gaming device) are downloadable to the gaming machine or gaming device through a data network when the gaming machine or gaming device is in a gaming establishment. In one embodiment, the computerized instructions for controlling any games are executed by at least one central server, central controller or remote host. In such a "thin client" embodiment, the central server remotely controls any games (or other suitable interfaces) and the gaming device is utilized to display such games (or suitable interfaces) and receive one or more inputs or commands from a player. In another embodiment, the computerized instructions for controlling any games are communicated from the central server, central controller or remote host to a gaming device local processor and memory devices. In such a "thick client" embodiment, the gaming device local processor executes the communicated computerized instructions to control any games (or other suitable interfaces) provided to a player.

In one embodiment, one or more gaming devices in a gaming system may be thin client gaming devices and one or more gaming devices in the gaming system may be thick client gaming devices. In another embodiment, certain functions of the gaming device are implemented in a thin client environment and certain other functions of the gaming device are implemented in a thick client environment. In one such embodiment, computerized instructions for controlling any primary games are communicated from the central server to the gaming device in a thick client configuration and computerized instructions for controlling any secondary games or bonus functions are executed by a central server in a thin client configuration.

Figure 1A:
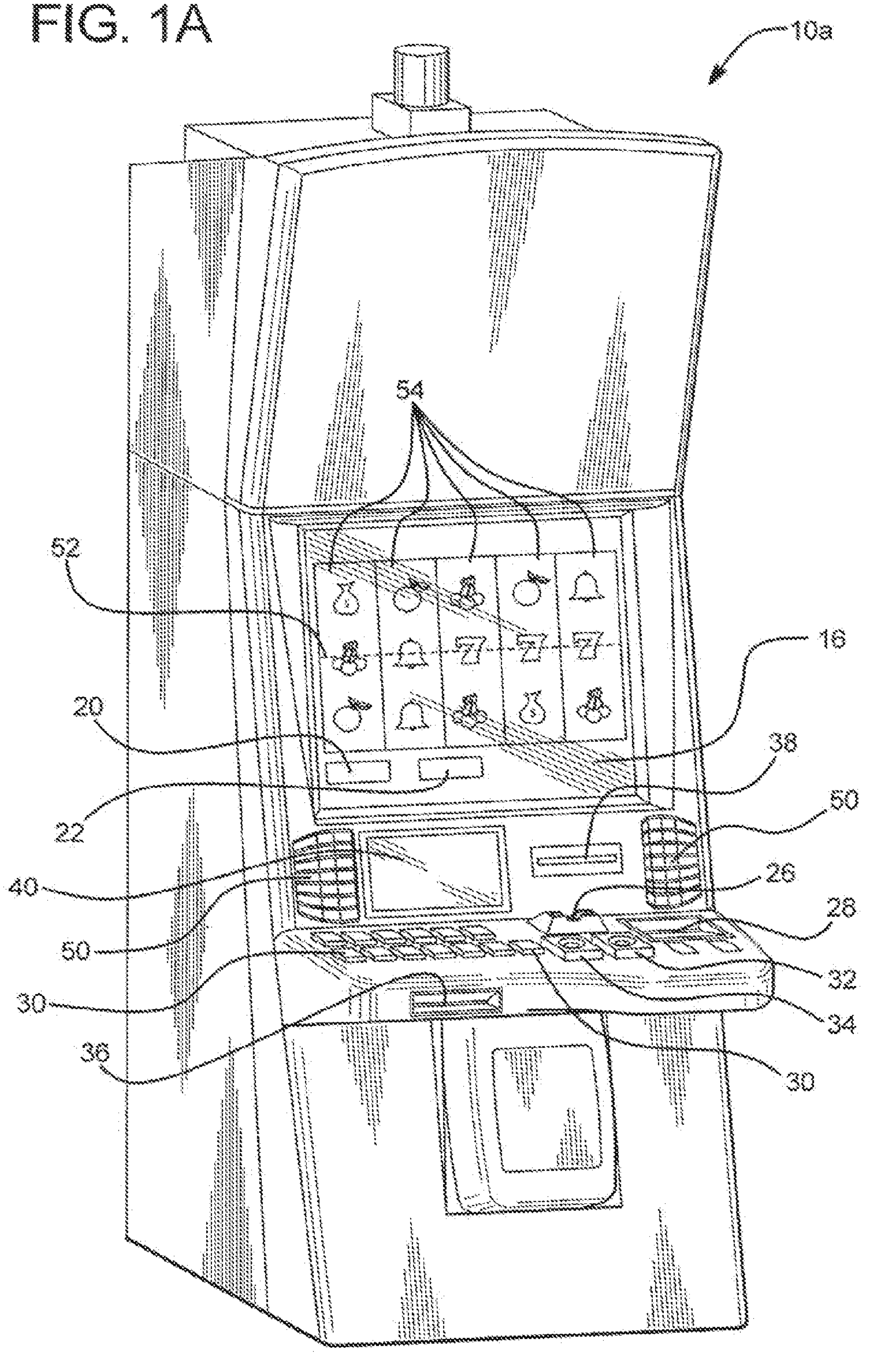
FIG. 1A is a front-side perspective view of one embodiment of the gaming device disclosed herein.
Figure 1B:
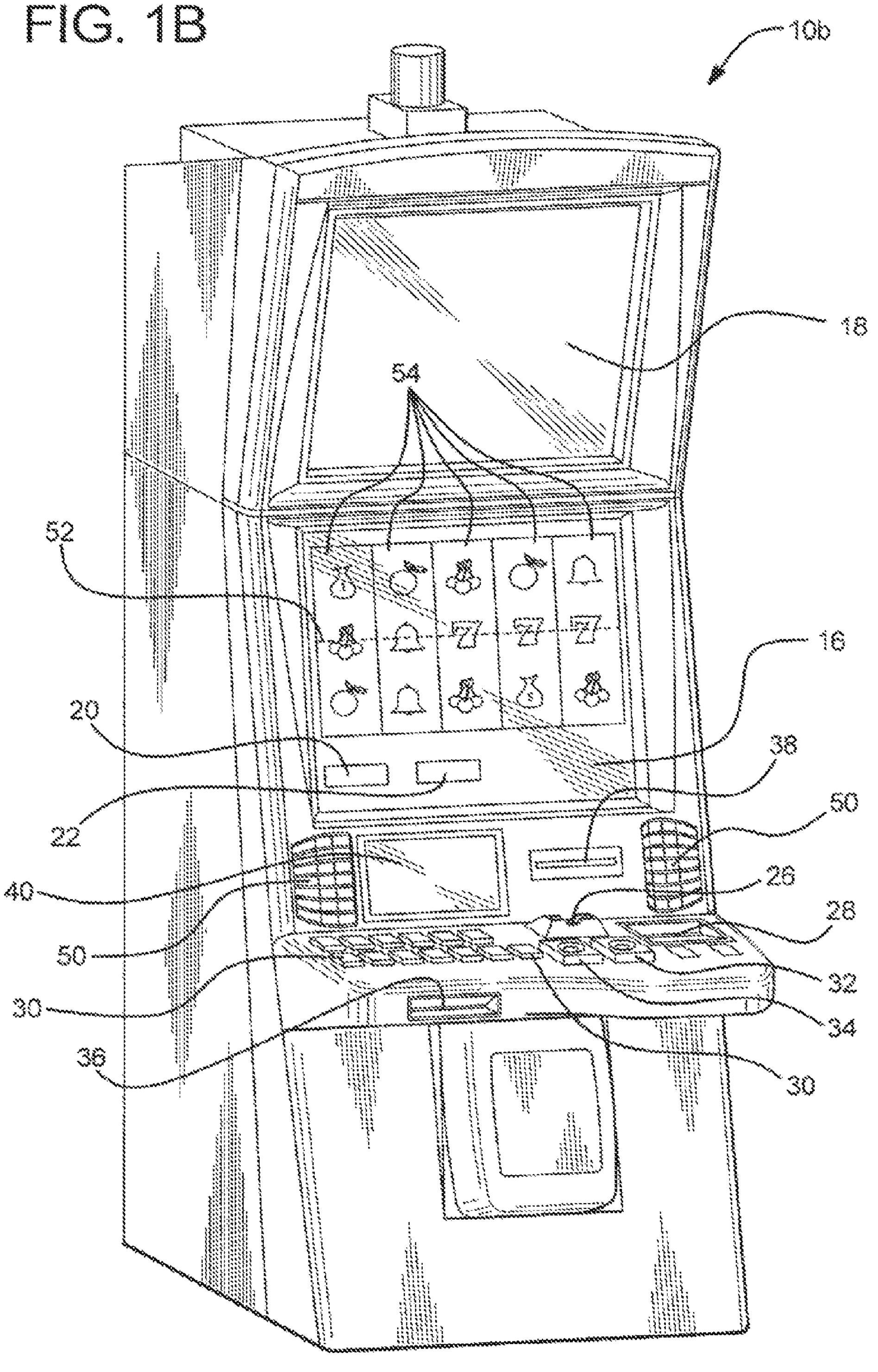
FIG. 1B is a front-side perspective view of another embodiment of the gaming device disclosed herein.

Referring now to the drawings, two example alternative embodiments of the gaming device disclosed herein are illustrated in FIGS. 1A and 1B as gaming device 10*a* and gaming device 10*b*, respectively. Gaming device 10*a* and/or gaming device 10*b* are generally referred to herein as gaming device 10.

In the embodiments illustrated in FIGS. 1A and 13, gaming device 10 has a support structure, housing or cabinet which provides support for a plurality of displays, inputs, controls and other features of a conventional gaming machine. It is configured so that a player can operate it while standing or sitting. The gaming device may be positioned on a base or stand or can be configured as a pub-style table-top game (not shown) which a player can operate preferably while sitting. As illustrated by the different configurations shown in FIGS. 1A and 1B, the gaming device may have varying cabinet and display configurations.

Figure 2A:
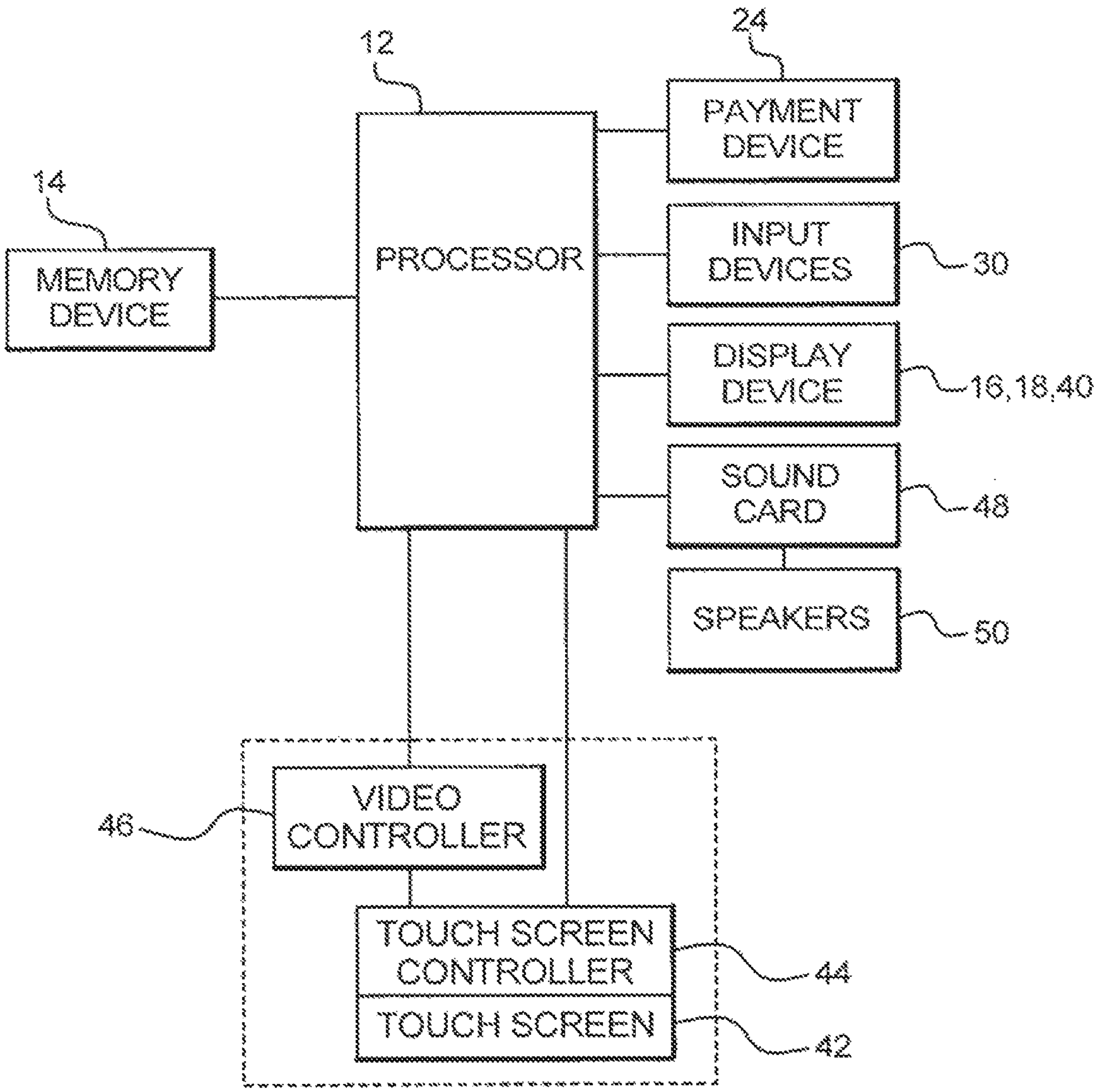
FIG. 2A is a schematic block diagram of the electronic configuration of one embodiment of the gaming device disclosed herein.

In one embodiment, as illustrated in FIG. 2A, the gaming device preferably includes at least one processor 12, such as a microprocessor, a microcontroller-based platform, a suitable integrated circuit or one or more application-specific integrated circuits (ASIC's). The processor is in communication with or operable to access or to exchange signals with at least one data storage or memory device 14. In one embodiment, the processor and the memory device reside within the cabinet of the gaming device. The memory device stores program code and instructions, executable by the processor, to control the gaming device. The memory device also stores other data such as image data, event data, player input data, random or pseudo-random number generators, pay-table data or information and applicable game rules that relate to the play of the gaming device. In one embodiment, the memory device includes random access memory (RAM), which can include non-volatile RAM (NVRAM), magnetic RAM (MRAM), ferroelectric RAM (FeRAM) and other forms as commonly understood in the gaming industry. In one embodiment, the memory device includes read only memory (ROM). In one embodiment, the memory device includes flash memory and/or EEPROM (electrically erasable programmable read only memory). Any other suitable magnetic, optical and/or semiconductor memory may operate in conjunction with the gaming device disclosed herein.

In one embodiment, part or all of the program code and/or operating data described above can be stored in a detachable or removable memory device, including, but not limited to, a suitable cartridge, disk, CD ROM, DVD or USB memory device. In other embodiments, part or all of the program code and/or operating data described above can be downloaded to the memory device through a suitable network.

In one embodiment, an operator or a player can use such a removable memory device in a desktop computer, a laptop personal computer, a personal digital assistant (PDA), portable computing device, or other computerized platform to implement the present disclosure. In one embodiment, the gaming device or gaming machine disclosed herein is operable over a wireless network, such as part of a wireless gaming system. In this embodiment, the gaming machine may be a hand held device, a mobile device or any other suitable wireless device that enables a player to play any suitable game at a variety of different locations. It should be appreciated that a gaming device or gaming machine as disclosed herein may be a device that has obtained approval from a regulatory gaming commission or a device that has not obtained approval from a regulatory gaming commission. It should be appreciated that the processor and memory device may be collectively referred to herein as a "computer" or "controller."

In one embodiment, as discussed in more detail below, the gaming device randomly generates awards and/or other game outcomes based on probability data. In one such embodiment, this random determination is provided through utilization of a random number generator (RNG), such as a true random number generator, a pseudo random number generator or other suitable randomization process. In one embodiment, each award or other game outcome is associated with a probability and the gaming device generates the award or other game outcome to be provided to the player based on the associated probabilities. In this embodiment, since the gaming device generates outcomes randomly or based upon one or more probability calculations, there is no certainty that the gaming device will ever provide the player with any specific award or other game outcome.

In another embodiment, as discussed in more detail below, the gaming device employs a predetermined or finite set or pool of awards or other game outcomes. In this embodiment, as each award or other game outcome is provided to the player, the gaming device flags or removes the provided award or other game outcome from the predetermined set or pool. Once flagged or removed from the set or pool, the specific provided award or other game outcome from that specific pool cannot be provided to the player again. This type of gaming device provides players with all of the available awards or other game outcomes over the course of the play cycle and guarantees the amount of actual wins and losses.

In another embodiment, as discussed below, upon a player initiating game play at the gaming device, the gaming device enrolls in a bingo game. In this embodiment, a bingo server calls the bingo balls that result in a specific bingo game outcome. The resultant game outcome is communicated to the individual gaming device to be provided to a player. In one embodiment, this bingo outcome is displayed to the player as a bingo game and/or in any form in accordance with the present disclosure.

In one embodiment, as illustrated in FIG. 2A, the gaming device includes one or more display devices controlled by the processor. The display devices are preferably connected to or mounted to the cabinet of the gaming device. The embodiment shown in FIG. 1A includes a central display device 16 which displays a primary game. This display device may also display any suitable secondary game associated with the primary game as well as information relating to the primary or secondary game. The alternative embodiment shown in FIG. 1B includes a central display device 16 and an upper display device 18. The upper display device may display the primary game, any suitable secondary game associated or not associated with the primary game and/or information relating to the primary or secondary game. These display devices may also serve as digital glass operable to advertise games or other aspects of the gaming establishment. As seen in FIGS. 1A and 1B, in one embodiment, the gaming device includes a credit display 20 which displays a player's current number of credits, cash, account balance or the equivalent. In one embodiment, the gaming device includes a bet display 22 which displays a player's amount wagered. In one embodiment, as described in more detail below, the gaming device includes a player tracking display 40 which displays information regarding a player's playing tracking status.

In another embodiment, at least one display device may be a mobile display device, such as a PDA or tablet PC, that enables play of at least a portion of the primary or secondary game at a location remote from the gaming device.

The display devices may include, without limitation, a monitor, a television display, a plasma display, a liquid crystal display (LCD) a display based on light emitting diodes (LED), a display based on a plurality of organic light-emitting diodes (OLEDs), a display based on polymer light-emitting diodes (PLEDs), a display based on a plurality of surface-conduction electron-emitters (SEDs), a display including a projected and/or reflected image or any other suitable electronic device or display mechanism. In one embodiment, as described in more detail below, the display device includes a touch-screen with an associated touch-screen controller. The display devices may be of any suitable size and configuration, such as a square, a rectangle or an elongated rectangle.

The display devices of the gaming device are configured to display at least one and preferably a plurality of game or other suitable images, symbols and indicia such as any visual representation or exhibition of the movement of objects such as mechanical, virtual or video reels and wheels, dynamic lighting, video images, images of people, characters, places, things and faces of cards, and the like.

In one alternative embodiment, the symbols, images and indicia displayed on or of the display device may be in mechanical form. That is, the display device may include any electromechanical device, such as one or more mechanical objects, such as one or more rotatable wheels, reels or dice, configured to display at least one or a plurality of game or other suitable images, symbols or indicia.

As illustrated in FIG. 2A, in one embodiment, the gaming device includes at least one payment device 24 in communication with the processor. As seen in FIGS. 1A and 13, a payment device such as a payment acceptor includes a note, ticket or bill acceptor 28 wherein the player inserts paper money, a ticket or voucher and a coin slot 26 where the player inserts money, coins, or tokens. In other embodiments, payment devices such as readers or validators for credit cards, debit cards or credit slips may accept payment. In one embodiment, a player may insert an identification card into a card reader of the gaming device. In one embodiment, the identification card is a smart card having a programmed microchip or a magnetic strip coded with a player's identification, credit totals (or related data) and other relevant information. In another embodiment, a player may carry a portable device, such as a cell phone, a radio frequency identification tag or any other suitable wireless device, which communicates a player's identification, credit totals (or related data) and other relevant information to the gaming device. In one embodiment, money may be transferred to a gaming device through electronic funds transfer. When a player funds the gaming device, the processor determines the amount of funds entered and displays the corresponding amount on the credit or other suitable display as described above.

As seen in FIGS. 1A, 1B and 2A, in one embodiment the gaming device includes at least one and preferably a plurality of input devices 30 in communication with the processor. The input devices can include any suitable device which enables the player to produce an input signal which is received by the processor. In one embodiment, after appropriate funding of the gaming device, the input device is a game activation device, such as a play button 32 or a pull arm (not shown) which is used by the player to start any primary game or sequence of events in the gaming device. The play button can be any suitable play activator such as a bet one button, a max bet button or a repeat the bet button. In one embodiment, upon appropriate funding, the gaming device begins the game play automatically. In another embodiment, upon the player engaging one of the play buttons, the gaming device automatically activates game play.

In one embodiment, one input device is a bet one button. The player places a bet by pushing the bet one button. The player can increase the bet by one credit each time the player pushes the bet one button. When the player pushes the bet one button, the number of credits shown in the credit display preferably decreases by one, and the number of credits shown in the bet display preferably increases by one. In another embodiment, one input device is a bet max button (not shown) which enables the player to bet the maximum wager permitted for a game of the gaming device.

In one embodiment, one input device is a cash out button 34. The player may push the cash out button and cash out to receive a cash payment or other suitable form of payment corresponding to the number of remaining credits. In one embodiment, when the player cashes out, a payment device, such as a ticket, payment or note generator 36 prints or otherwise generates a ticket or credit slip to provide to the player. The player receives the ticket or credit slip and may redeem the value associated with the ticket or credit slip via a cashier (or other suitable redemption system). In another embodiment, when the player cashes out, the player receives the coins or tokens in a coin payout tray. It should be appreciated that any suitable payout mechanisms, such as funding to the player's electronically recordable identification card may be implemented in accordance with the gaming device disclosed herein.

In one embodiment, as mentioned above and seen in FIG. 2A, one input device is a touch-screen 42 coupled with a touch-screen controller 44, or some other touch-sensitive display overlay to allow for player interaction with the images on the display. The touch-screen and the touch-screen controller are connected to a video controller 46. A player can make decisions and input signals into the gaming device by touching the touch-screen at the appropriate places. One such input device is a conventional touch-screen button panel.

The gaming device may further include a plurality of communication ports for enabling communication of the processor with external peripherals, such as external video sources, expansion buses, game or other displays, an SCSI port or a key pad.

In one embodiment, as seen in FIG. 2A, the gaming device includes a sound generating device controlled by one or more sounds cards 48 which function in conjunction with the processor. In one embodiment, the sound generating device includes at least one and preferably a plurality of speakers 50 or other sound generating hardware and/or software for generating sounds, such as playing music for the primary and/or secondary game or for other modes of the gaming device, such as an attract mode. In one embodiment, the gaming device provides dynamic sounds coupled with attractive multimedia images displayed on one or more of the display devices to provide an audio-visual representation or to otherwise display full-motion video with sound to attract players to the gaming device. During idle periods, the gaming device may display a sequence of audio and/or visual attraction messages to attract potential players to the gaming device. The videos may also be customized for or to provide any appropriate information.

In one embodiment, the gaming machine may include a sensor, such as a camera in communication with the processor (and possibly controlled by the processor) that is selectively positioned to acquire an image of a player actively using the gaming device and/or the surrounding area of the gaming device. In one embodiment, the camera may be configured to selectively acquire still or moving (e.g., video) images and may be configured to acquire the images in either an analog, digital or other suitable format. The display devices may be configured to display the image acquired by the camera as well as display the visible manifestation of the game in split screen or picture-in-picture fashion. For example, the camera may acquire an image of the player and the processor may incorporate that mage into the primary and/or secondary game as a game image, symbol or indicia.

Gaming device 10 can incorporate any suitable wagering primary or base game. The gaming machine or device may include some or all of the features of conventional gaming machines or devices. The primary or base game may comprise any suitable reel-type game, card game, cascading or falling symbol game, number game or other game of chance susceptible to representation in an electronic or electromechanical form, which in one embodiment produces a random outcome based on probability data at the time of or after placement of a wager. That is, different primary wagering games, such as video poker games, video blackjack games, video keno, video bingo or any other suitable primary or base game may be implemented.

In one embodiment, as illustrated in FIGS. 1A and 1B, a base or primary game may be a slot game with one or more paylines 52. The paylines may be horizontal, vertical, circular, diagonal, angled or any combination thereof. In this embodiment, the gaming device includes at least one and preferably a plurality of reels 54, such as three to five reels 54, in either electromechanical form with mechanical rotating reels or video form with simulated reels and movement thereof. In one embodiment, an electromechanical slot machine includes a plurality of adjacent, rotatable reels which may be combined and operably coupled with an electronic display of any suitable type. In another embodiment, if the reels 54 are in video form, one or more of the display devices, as described above, display the plurality of simulated video reels 54. Each reel 54 displays a plurality of indicia or symbols, such as bells, hearts, fruits, numbers, letters, bars or other images which preferably correspond to a theme associated with the gaming device. In another embodiment, one or more of the reels are independent reels or unisymbol reels. In this embodiment, each independent or unisymbol reel generates and displays one symbol to the player. In one embodiment, the gaming device awards prizes after the reels of the primary game stop spinning if specified types and/or configurations of indicia or symbols occur on an active payline or otherwise occur in a winning pattern, occur on the requisite number of adjacent reels and/or occur in a scatter pay arrangement.

In an alternative embodiment, rather than determining any outcome to provide to the player by analyzing the symbols generated on any wagered upon paylines as described above, the gaming device determines any outcome to provide to the player based on the number of associated symbols which are generated in active symbol positions on the requisite number of adjacent reels (i.e., not on paylines passing through any displayed winning symbol combinations). In this embodiment, if a winning symbol combination is generated on the reels, the gaming device provides the player one award for that occurrence of the generated winning symbol combination. For example, if one winning symbol combination is generated on the reels, the gaming device will provide a single award to the player for that winning symbol combination (i.e., not based on the number of paylines that would have passed through that winning symbol combination). It should be appreciated that because a gaming device with wagering on ways to win provides the player one award for a single occurrence of a winning symbol combination and a gaming device with paylines may provide the player more than one award for the same occurrence of a single winning symbol combination (i.e., if a plurality of paylines each pass through the same winning symbol combination), it is possible to provide a player at a ways to win gaming device with more ways to win for an equivalent bet or wager on a traditional slot gaming device with paylines.

In one embodiment, the total number of ways to win is determined by multiplying the number of symbols generated in active symbol positions on a first reel by the number of symbols generated in active symbol positions on a second reel by the number of symbols generated in active symbol positions on a third reel and so on for each reel of the gaming device with at least one symbol generated in an active symbol position. For example, a three reel gaming device with three symbols generated in active symbol positions on each reel includes 27 ways to win (i.e., 3 symbols on the first reel×3 symbols on the second reel×3 symbols on the third reel). A four reel gaming device with three symbols generated in active symbol positions on each reel includes 81 ways to win (i.e., 3 symbols on the first reel×3 symbols on the second reel×3 symbols on the third reel×3 symbols on the fourth reel). A five reel gaming device with three symbols generated in active symbol positions on each reel includes 243 ways to win (i.e., 3 symbols on the first reel×3 symbols on the second reel×3 symbols on the third reel×3 symbols on the fourth reel×3 symbols on the fifth reel). It should be appreciated that modifying the number of generated symbols by either modifying the number of reels or modifying the number of symbols generated in active symbol positions by one or more of the reels, modifies the number of ways to win.

In another embodiment, the gaming device enables a player to wager on and thus activate symbol positions. In one such embodiment, the symbol positions are on the reels. In this embodiment, if based on the player's wager, a reel is activated, then each of the symbol positions of that reel will be activated and each of the active symbol positions will be part of one or more of the ways to win. In one embodiment, if based on the player's wager, a reel is not activated, then a designated number of default symbol positions, such as a single symbol position of the middle row of the reel, will be activated and the default symbol position(s) will be part of one or more of the ways to win. This type of gaming machine enables a player to wager on one, more or each of the reels and the processor of the gaming device uses the number of wagered on reels to determine the active symbol positions and the number of possible ways to win. In alternative embodiments, (1) no symbols are displayed as generated at any of the inactive symbol positions, or (2) any symbols generated at any inactive symbol positions may be displayed to the player but suitably shaded or otherwise designated as inactive.

In one embodiment wherein a player wagers on one or more reels, a player's wager of one credit may activate each of the three symbol positions on a first reel, wherein one default symbol position is activated on each of the remaining four reels. In this example, as described above, the gaming device provides the player three ways to win (i.e., 3 symbols on the first reel×1 symbol on the second reel×1 symbol on the third reel×1 symbol on the fourth reel×1 symbol on the fifth reel). In another example, a player's wager of nine credits may activate each of the three symbol positions on a first reel, each of the three symbol positions on a second reel and each of the three symbol positions on a third reel wherein one default symbol position is activated on each of the remaining two reels. In this example, as described above, the gaming device provides the player twenty-seven ways to win (i.e., 3 symbols on the first reel×3 symbols on the second reel×3 symbols on the third reel×1 symbol on the fourth reel×1 symbol on the fifth reel).

In one embodiment, to determine any award(s) to provide to the player based on the generated symbols, the gaming device individually determines if a symbol generated in an active symbol position on a first reel forms part of a winning symbol combination with or is otherwise suitably related to a symbol generated in an active symbol position on a second reel. In this embodiment, the gaming device classifies each pair of symbols which form part of a winning symbol combination (i.e., each pair of related symbols) as a string of related symbols. For example, if active symbol positions include a first cherry symbol generated in the top row of a first reel and a second cherry symbol generated in the bottom row of a second reel, the gaming device classifies the two cherry symbols as a string of related symbols because the two cherry symbols form part of a winning symbol combination.

After determining if any strings of related symbols are formed between the symbols on the first reel and the symbols on the second reel, the gaming device determines if any of the symbols from the next adjacent reel should be added to any of the formed strings of related symbols. In this embodiment, for a first of the classified strings of related symbols, the gaming device determines if any of the symbols generated by the next adjacent reel form part of a winning symbol combination or are otherwise related to the symbols of the first string of related symbols. If the gaming device determines that a symbol generated on the next adjacent reel is related to the symbols of the first string of related symbols, that symbol is subsequently added to the first string of related symbols. For example, if the first string of related symbols is the string of related cherry symbols and a related cherry symbol is generated in the middle row of the third reel, the gaming device adds the related cherry symbol generated on the third reel to the previously classified string of cherry symbols.

On the other hand, if the gaming device determines that no symbols generated on the next adjacent reel are related to the symbols of the first string of related symbols, the gaming device marks or flags such string of related symbols as complete. For example, if the first string of related symbols is the string of related cherry symbols and none of the symbols of the third reel are related to the cherry symbols of the previously classified string of cherry symbols, the gaming device marks or flags the string of cherry symbols as complete.

After either adding a related symbol to the first string of related symbols or marking the first string of related symbols as complete, the gaming device proceeds as described above for each of the remaining classified strings of related symbols which were previously classified or formed from related symbols on the first and second reels.

After analyzing each of the remaining strings of related symbols, the gaming device determines, for each remaining pending or incomplete string of related symbols, if any of the symbols from the next adjacent reel, if any, should be added to any of the previously classified strings of related symbols. This process continues until either each string of related symbols is complete or there are no more adjacent reels of symbols to analyze. In this embodiment, where there are no more adjacent reels of symbols to analyze, the gaming device marks each of the remaining pending strings of related symbols as complete.

When each of the strings of related symbols is marked complete, the gaming device compares each of the strings of related symbols to an appropriate paytable and provides the player any award associated with each of the completed strings of symbols. It should be appreciated that the player is provided one award, if any, for each string of related symbols generated in active symbol positions (i.e., as opposed to being based on how many paylines that would have passed through each of the strings of related symbols in active symbol positions).

In one embodiment, a base or primary game may be a poker game wherein the gaming device enables the player to play a conventional game of video draw poker and initially deals five cards all face up from a virtual deck of fifty-two card deck. Cards may be dealt as in a traditional game of cards or in the case of the gaming device, may also include that the cards are randomly selected from a predetermined number of cards. If the player wishes to draw, the player selects the cards to hold via one or more input device, such as pressing related hold buttons or via the touch screen. The player then presses the deal button and the unwanted or discarded cards are removed from the display and the gaming machine deals the replacement cards from the remaining cards in the deck. This results in a final five-card hand. The gaming device compares the final five-card hand to a payout table which utilizes conventional poker hand rankings to determine the winning hands. The gaming device provides the player with an award based on a winning hand and the credits the player wagered.

In another embodiment, the base or primary game may be a multi-hand version of video poker. In this embodiment, the gaming device deals the player at least two hands of cards. In one such embodiment, the cards are the same cards. In one embodiment each hand of cards is associated with its own deck of cards. The player chooses the cards to hold in a primary hand. The held cards in the primary hand are also held in the other hands of cards. The remaining non-held cards are removed from each hand displayed and for each hand replacement cards are randomly dealt into that hand. Since the replacement cards are randomly dealt independently for each hand, the replacement cards for each hand will usually be different. The poker hand rankings are then determined hand by hand and awards are provided to the player.

In one embodiment, a base or primary game may be a keno game wherein the gaming device displays a plurality of selectable indicia or numbers on at least one of the display devices. In this embodiment, the player selects at least one or a plurality of the selectable indicia or numbers via an input device such as the touch screen. The gaming device then displays a series of drawn numbers to determine an amount of matches, if any, between the player's selected numbers and the gaming device's drawn numbers. The player is provided an award based on the amount of matches, if any, based on the amount of determined matches and the number of numbers drawn.

In one embodiment, in addition to winning credits or other awards in a base or primary game, the gaming device may also give players the opportunity to win credits in a bonus or secondary game or bonus or secondary round. The bonus or secondary game enables the player to obtain a prize or payout in addition to the prize or payout, if any, obtained from the base or primary game. In general, a bonus or secondary game produces a significantly higher level of player excitement than the base or primary game because it provides a greater expectation of winning than the base or primary game and is accompanied with more attractive or unusual features than the base or primary game. In one embodiment, the bonus or secondary game may be any type of suitable game, either similar to or completely different from the base or primary game.

In one embodiment, the triggering event or qualifying condition may be a selected outcome in the primary game or a particular arrangement of one or more indicia on a display device in the primary game, such as the number seven appearing on three adjacent reels along a payline in the primary slot game embodiment seen in FIGS. 1A and 1B. In other embodiments, the triggering event or qualifying condition may be by exceeding a certain amount of game play (such as number of games, number of credits, amount of time), or reaching a specified number of points earned during game play.

In another embodiment, the gaming device processor 12 or central server 56 randomly provides the player one or more plays of one or more secondary games. In one such embodiment, the gaming device does not provide any apparent reasons to the player for qualifying to play a secondary or bonus game. In this embodiment, qualifying for a bonus game is not triggered by an event in or based specifically on any of the plays of any primary game. That is, the gaming device may simply qualify a player to play a secondary game without any explanation or alternatively with simple explanations. In another embodiment, the gaming device (or central server) qualifies a player for a secondary game at least partially based on a game triggered or symbol triggered event, such as at least partially based on the play of a primary game.

In one embodiment, the gaming device includes a program which will automatically begin a bonus round after the player has achieved a triggering event or qualifying condition in the base or primary game. In another embodiment, after a player has qualified for a bonus game, the player may subsequently enhance his/her bonus game participation through continued play on the base or primary game. Thus, for each bonus qualifying event, such as a bonus symbol, that the player obtains, a given number of bonus game wagering credits may be accumulated in a "bonus meter" programmed to accrue the bonus wagering credits or entries toward eventual participation in a bonus game. The occurrence of multiple such bonus qualifying events in the primary game may result in an arithmetic or exponential increase in the number of bonus wagering credits awarded. In one embodiment, the player may redeem extra bonus wagering credits during the bonus game to extend play of the bonus game.

In one embodiment, no separate entry fee or buy in for a bonus game need be employed. That is, a player may not purchase an entry into a bonus game, rather they must win or earn entry through play of the primary game thus, encouraging play of the primary game. In another embodiment, qualification of the bonus or secondary game is accomplished through a simple "buy in" by the player, for example, if the player has been unsuccessful at qualifying through other specified activities. In another embodiment, the player must make a separate side-wager on the bonus game or wager a designated amount in the primary game to qualify for the secondary game. In this embodiment, the secondary game triggering event must occur and the side-wager (or designated primary game wager amount) must have been placed to trigger the secondary game.

Figure 2B:
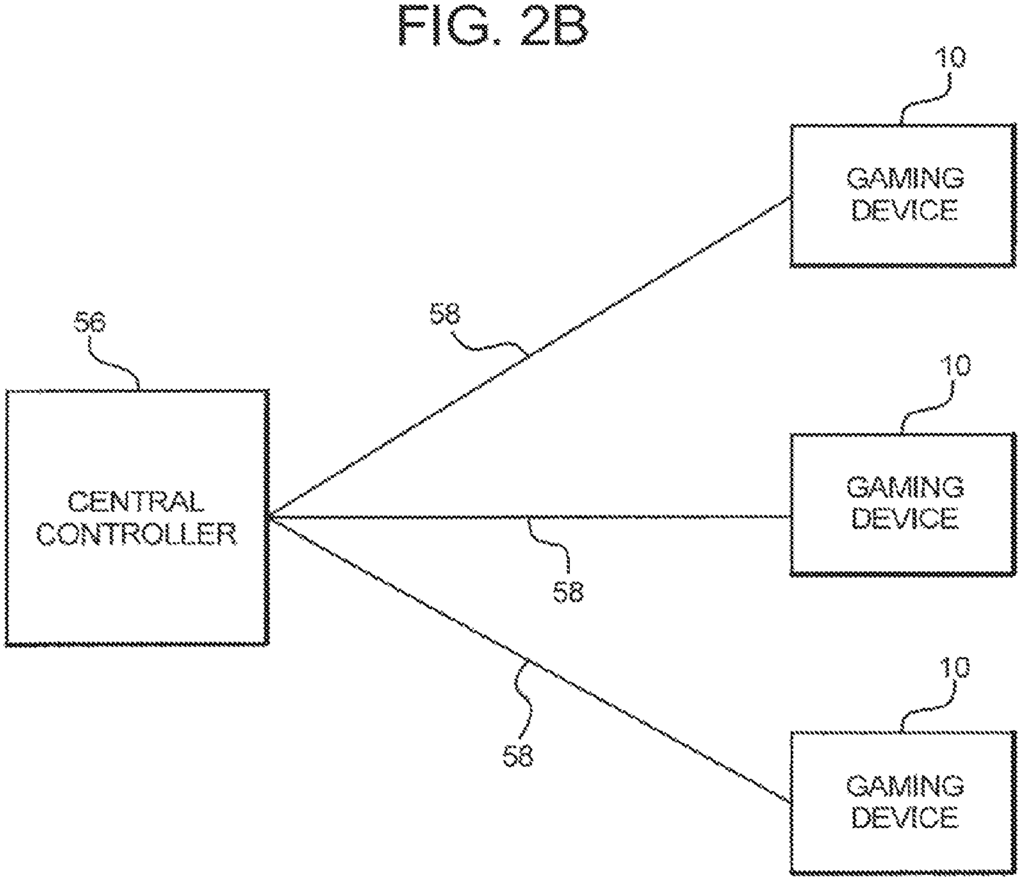
FIG. 2B is a schematic block diagram illustrating a plurality of gaming terminals in communication with a central controller.

In one embodiment, as illustrated in FIG. 2B, one or more of the gaming devices 10 are in communication with each other and/or at least one central server, central controller or remote host 56 through a data network or remote communication link 58. In this embodiment, the central server, central controller or remote host is any suitable server or computing device which includes at least one processor and at least one memory or storage device. In different such embodiments, the central server is a progressive controller or a processor of one of the gaming devices in the gaming system. In these embodiments, the processor of each gaming device is designed to transmit and receive events, messages, commands or any other suitable data or signal between the individual gaming device and the central server. The gaming device processor is operable to execute such communicated events, messages or commands in conjunction with the operation of the gaming device. Moreover, the processor of the central server is designed to transmit and receive events, messages, commands or any other suitable data or signal between the central server and each of the individual gaming devices. The central server processor is operable to execute such communicated events, messages or commands in conjunction with the operation of the central server. It should be appreciated that one, more or each of the functions of the central controller as disclosed herein may be performed by one or more gaming device processors. It should be further appreciated that one, more or each of the functions of one or more gaming device processors as disclosed herein may be performed by the central controller.

In one embodiment, the game outcome provided to the player is determined by a central server or controller and provided to the player at the gaming device. In this embodiment, each of a plurality of such gaming devices are in communication with the central server or controller. Upon a player initiating game play at one of the gaming devices, the initiated gaming device communicates a game outcome request to the central server or controller.

In one embodiment, the central server or controller receives the game outcome request and randomly generates a game outcome for the primary game based on probability data. In another embodiment, the central server or controller randomly generates a game outcome for the secondary game based on probability data. In another embodiment, the central server or controller randomly generates a game outcome for both the primary game and the secondary game based on probability data. In this embodiment, the central server or controller is capable of storing and utilizing program code or other data similar to the processor and memory device of the gaming device.

In an alternative embodiment, the central server or controller maintains one or more predetermined pools or sets of predetermined game outcomes. In this embodiment, the central server or controller receives the game outcome request and independently selects a predetermined game outcome from a set or pool of game outcomes. The central server or controller flags or marks the selected game outcome as used. Once a game outcome is flagged as used, it is prevented from further selection from the set or pool and cannot be selected by the central controller or server upon another wager. The provided game outcome can include a primary game outcome, a secondary game outcome, primary and secondary game outcomes, or a series of game outcomes such as free games.

The central server or controller communicates the generated or selected game outcome to the initiated gaming device. The gaming device receives the generated or selected game outcome and provides the game outcome to the player. In an alternative embodiment, how the generated or selected game outcome is to be presented or displayed to the player, such as a reel symbol combination of a slot machine or a hand of cards dealt in a card game, is also determined by the central server or controller and communicated to the initiated gaming device to be presented or displayed to the player. Central production or control can assist a gaming establishment or other entity in maintaining appropriate records, controlling gaming, reducing and preventing cheating or electronic or other errors, reducing or eliminating win-loss volatility and the like.

In another embodiment, a predetermined game outcome value is determined for each of a plurality of linked or networked gaming devices based on the results of a bingo, keno or lottery game. In this embodiment, each individual gaming device utilizes one or more bingo, keno or lottery games to determine the predetermined game outcome value provided to the player for the interactive game played at that gaming device. In one embodiment, the bingo, keno or lottery game is displayed to the player. In another embodiment, the bingo, keno or lottery game is not displayed to the player, but the results of the bingo, keno or lottery game determine the predetermined game outcome value for the primary or secondary game.

In the various bingo embodiments, as each gaming device is enrolled in the bingo game, such as upon an appropriate wager or engaging an input device, the enrolled gaming device is provided or associated with a different bingo card. Each bingo card consists of a matrix or array of elements, wherein each element is designated with a separate indicia, such as a number. It should be appreciated that each different bingo card includes a different combination of elements. For example, if four bingo cards are provided to four enrolled gaming devices, the same element may be present on all four of the bingo cards while another element may solely be present on one of the bingo cards.

In operation of these embodiments, upon providing or associating a different bingo card to each of a plurality of enrolled gaming devices, the central controller randomly selects or draws, one at a time, a plurality of the elements. As each element is selected, a determination is made for each gaming device as to whether the selected element is present on the bingo card provided to that enrolled gaming device. This determination can be made by the central controller, the gaming device, a combination of the two, or in any other suitable manner. If the selected element is present on the bingo card provided to that enrolled gaming device, that selected element on the provided bingo card is marked or flagged. This process of selecting elements and marking any selected elements on the provided bingo cards continues until one or more predetermined patterns are marked on one or more of the provided bingo cards. It should be appreciated that in one embodiment, the gaming device requires the player to engage a daub button (not shown) to initiate the process of the gaming device marking or flagging any selected elements.

After one or more predetermined patterns are marked on one or more of the provided bingo cards, a game outcome is determined for each of the enrolled gaming devices based, at least in part, on the selected elements on the provided bingo cards. As described above, the game outcome determined for each gaming device enrolled in the bingo game is utilized by that gaming device to determine the predetermined game outcome provided to the player. For example, a first gaming device to have selected elements marked in a predetermined pattern is provided a first outcome of win $10 which will be provided to a first player regardless of how the first player plays in a first game and a second gaming device to have selected elements marked in a different predetermined pattern is provided a second outcome of win $2 which will be provided to a second player regardless of how the second player plays a second game. It should be appreciated that as the process of marking selected elements continues until one or more predetermined patterns are marked, this embodiment ensures that at least one bingo card will win the bingo game and thus at least one enrolled gaming device will provide a predetermined winning game outcome to a player. It should be appreciated that other suitable methods for selecting or determining one or more predetermined game outcomes may be employed.

In one example of the above-described embodiment, the predetermined game outcome may be based on a supplemental award in addition to any award provided for winning the bingo game as described above. In this embodiment, if one or more elements are marked in supplemental patterns within a designated number of drawn elements, a supplemental or intermittent award or value associated with the marked supplemental pattern is provided to the player as part of the predetermined game outcome. For example, if the four corners of a bingo card are marked within the first twenty selected elements, a supplemental award of $10 is provided to the player as part of the predetermined game outcome. It should be appreciated that in this embodiment, the player of a gaming device may be provided a supplemental or intermittent award regardless of if the enrolled gaming device's provided bingo card wins or does not win the bingo game as described above.

In another embodiment, one or more of the gaming devices are in communication with a central server or controller for monitoring purposes only. That is, each individual gaming device randomly generates the game outcomes to be provided to the player and the central server or controller monitors the activities and events occurring on the plurality of gaming devices. In one embodiment, the gaming network includes a real-time or on-line accounting and gaming information system operably coupled to the central server or controller. The accounting and gaming information system of this embodiment includes a player database for storing player profiles, a player tracking module for tracking players and a credit system for providing automated casino transactions.

In one embodiment, the gaming device disclosed herein is associated with or otherwise integrated with one or more player tracking systems. Player tracking systems enable gaming establishments to recognize the value of customer loyalty through identifying frequent customers and rewarding them for their patronage. In one embodiment, the gaming device and/or player tracking system tracks any players gaming activity at the gaming device. In one such embodiment, the gaming device includes at least one card reader 38 in communication with the processor. In this embodiment, a player is issued a player identification card which has an encoded player identification number that uniquely identifies the player. When a player inserts their playing tracking card into the card reader to begin a gaming session, the card reader reads the player identification number off the player tracking card to identify the player. The gaming device and/or associated player tracking system timely tracks any suitable information or data relating to the identified player's gaming session. Directly or via the central controller, the gaming device processor communicates such information to the player tracking system. The gaming device and/or associated player tracking system also timely tracks when a player removes their player tracking card when concluding play for that gaming session. In another embodiment, rather than requiring a player to insert a player tracking card, the gaming device utilizes one or more portable devices carried by a player, such as a cell phone, a radio frequency identification tag or any other suitable wireless device to track when a player begins and ends a gaming session. In another embodiment, the gaming device utilizes any suitable biometric technology or ticket technology to track when a player begins and ends a gaming session.

During one or more gaming sessions, the gaming device and/or player tracking system tracks any suitable information or data, such as any amounts wagered, average wager amounts and/or the time these wagers are placed. In different embodiments, for one or more players, the player tracking system includes the player's account number, the player's card number, the player's first name, the player's surname, the player's preferred name, the player's player tracking ranking, any promotion status associated with the player's player tracking card, the player's address, the player's birthday, the player's anniversary, the player's recent gaming sessions, or any other suitable data. In one embodiment, such tracked information and/or any suitable feature associated with the player tracking system is displayed on a player tracking display 40. In another embodiment, such tracked information and/or any suitable feature associated with the player tracking system is displayed via one or more service windows (not shown) which are displayed on the central display device and/or the upper display device.

In one embodiment, a plurality of the gaming devices are capable of being connected together through a data network. In one embodiment, the data network is a local area network (LAN), in which one or more of the gaming devices are substantially proximate to each other and an on-site central server or controller as in, for example, a gaming establishment or a portion of a gaming establishment. In another embodiment, the data network is a wide area network (WAN) in which one or more of the gaming devices are in communication with at least one off-site central server or controller. In this embodiment, the plurality of gaming devices may be located in a different part of the gaming establishment or within a different gaming establishment than the off-site central server or controller. Thus, the WAN may include an off-site central server or controller and an off-site gaming device located within gaming establishments in the same geographic area, such as a city or state. The WAN gaming system may be substantially identical to the LAN gaming system described above, although the number of gaming devices in each system may vary relative to each other.

In another embodiment, the gaming system disclosed herein is implemented via a data network, such as an internet or intranet. In one such embodiment, the operation of a gaming device can be viewed at the gaming device with at least one internet browser. In another such embodiment, the operation of a gaming device can be viewed at a location remote from the gaming device or gaming establishment utilizing at least one internet browser. In these embodiments, operation of the gaming device may be accomplished with only a connection to the central server or controller (i.e., an internet/intranet server) through a conventional phone or other data transmission line, digital subscriber line (DSL), T-1 line, coaxial cable, fiber optic cable, or other suitable connection. Accordingly, players may access an internet game page from any location where an internet connection and computer, or other internet facilitator is available. It should be appreciated that the expansion in the number of computers and number and speed of internet connections in recent years increases opportunities for players to play from an ever-increasing number of remote sites. It should be further appreciated that enhanced bandwidth of digital wireless communications may render such technology suitable for some or all communications, particularly if such communications are encrypted. Higher data transmission speeds may be useful for enhancing the sophistication and response of the display and interaction with the player.

In one embodiment, the central server (i.e., an internet/intranet server) maintains at least one dedicated gaming site which is associated with one or more progressive awards and one or more supplemental funds as disclosed herein. In operation, a player logs onto the dedicated gaming site and the central server enables the player to wager on and participate in one or more online games at this gaming site. In this embodiment, upon the occurrence of any progressive award increase event, the central server adds a value or amount (from the maintained supplemental fund) to one or more of the progressive awards associated with the dedicated gaming site.

In one embodiment, to regulate and monitor the play of games over the Internet, player's identifications are verified through credit card authentication. Through this authentication, the gaming system verifies the player, the player's age, the player's location and any other suitable information associated with the player. In one such embodiment, the gaming system utilizes the verified location information to monitor and ensure that the player in a certain location follows any applicable gaming regulations associated with that location. In another such embodiment, the gaming system utilizes the verified location information to set up different progressive awards for different regions. In this embodiment, different progressive awards are allotted per region.

In another embodiment including game play over the internet, the gaming system stores information about one or more players. In this embodiment, after a player has enrolled or identified themselves with the gaming system (via the dedicated gaming site), the gaming system stores their information, such as credit card information, preferred options, player number, name, or any other information in a database. In one such embodiment, the gaming system enables the player to set and store one or more gaming options, such as jackpot betting, side wagering, and preferred games, associated with the dedicated gaming site.

As mentioned above, in one embodiment, the present disclosure may be employed in a server based gaming system. In one such embodiment, as described above, one or more gaming devices are in communication with a central server or controller. The central server or controller may be any suitable server or computing device which includes at least one processor and a memory or storage device. In alternative embodiments, the central server is a progressive controller or another gaming machine in the gaming system. In one embodiment, the memory device of the central server stores different game programs and instructions, executable by a gaming device processor, to control the gaming device. Each executable game program represents a different game or type of game which may be played on one or more of the gaming devices in the gaming system. Such different games may include the same or substantially the same game play with different pay tables. In different embodiments, the executable game program is for a primary game, a secondary game or both. In another embodiment, the game program may be executable as a secondary game to be played simultaneous with the play of a primary game (which may be downloaded to or fixed on the gaming device) or vice versa.

In this embodiment, each gaming device at least includes one or more display devices and/or one or more input devices for interaction with a player. A local processor, such as the above-described gaming device processor or a processor of a local server, is operable with the display device (s) and/or the input device(s) of one or more of the gaming devices.

In operation, the central controller is operable to communicate one or more of the stored game programs to at least one local processor. In different embodiments, the stored game programs are communicated or delivered by embedding the communicated game program in a device or a component (e.g., a microchip to be inserted in a gaming device), writing the game program on a disc or other media, downloading or streaming the game program over a dedicated data network, internet or a telephone line. After the stored game programs are communicated from the central server, the local processor executes the communicated program to facilitate play of the communicated program by a player through the display device(s) and/or input device(s) of the gaming device. That is, when a game program is communicated to a local processor, the local processor changes the game or type of game played at the gaming device.

In one embodiment, in addition to the progressive awards with values that are based, at least in part, on zero, one or more bonus event elements as described below, a plurality of gaming devices at one or more gaming sites are networked to the central server in a progressive configuration, wherein a portion of each wager placed is allocated to one or more progressive awards. In one embodiment, such progressive awards are associated with the system of gaming machines which each contribute portions of the progressive awards. In one such embodiment, different progressive awards are associated with different numbers of gaming devices. For example, a progressive award valued at $10,000 may be associated with ten gaming devices while another progressive award valued at $500,000 may be associated with one-hundred gaming devices. In one embodiment, the multiple gaming machines may be in the same bank of machines, in the same casino or gaming establishment such as through a LAN or in two or more different casinos or gaming establishments such as through a WAN. In another embodiment, each individual gaming machine maintains one or more progressive awards wherein a portion of each wager placed at that respective gaming machine is allocated to one or more progressive awards maintained by such individual gaming machine. In another embodiment, each individual gaming machine maintains one or more progressive awards and the central server simultaneously or substantially simultaneously maintains one or more progressive awards. In one such embodiment, the lower valued, more frequently triggered progressive awards are maintained by the individual gaming machines and the higher valued, less frequently triggered progressive awards are maintained by the central server.

In one embodiment, a host site computer is coupled to a plurality of the central servers at a variety of mutually remote gaming sites for providing a multi-site linked progressive automated gaming system. In one embodiment, a host site computer may serve gaming devices distributed throughout a number of properties at different geographical locations including, for example, different locations within a city or different cities within a state. In one embodiment, the host site computer is maintained for the overall operation and control of the system. In this embodiment, a host site computer oversees all or part of the progressive gaming system and is the master for computing all or part of the progressive jackpots. All participating gaming sites report to, and receive information from, the host site computer. Each central server computer is responsible for all data communication between the gaming device hardware and software and the host site computer.

In one embodiment, more than one of the progressive awards start at the same level, such as $1000 and increment or increase until provided to a player. In another embodiment, more than one of the progressive awards start at different levels such as $10, $100, $1000 and $10,000 and increment or increase until provided to a player. The progressive awards accumulate based on a small percentage (such as 0.1%) of coin-in or wagered amounts in a conventional manner. In one embodiment, the percentage that goes to each progressive award is equal (such as 0.1% to each of four progressive awards). At this accrual rate, player wagers totaling $1,000,000 are required for the progressive to reach $1000. In one embodiment, at least a fraction of this amount may be funded by the casino by using a starting value higher than zero to make the progressive awards attractive even after they are reset. In other embodiments, two or more of the progressive awards may be funded by different percentages. In these embodiments, the central server and/or individual gaming device processor continues to increase the progressive levels until a progressive award is provided to a player (upon the occurrence of a progressive award triggering event), at which point the progressive is reset and another progressive award starts incrementing from the appropriate default progressive award level. In another embodiment, one or more progressive awards increment a predetermined amount per game played. In one such embodiment, this incremental amount is partially funded by an amount of the wagers placed and is partially funded by an amount provided by a gaming establishment marketing or advertisement department. In different embodiments, the gaming establishment marketing or advertisement department provides a value or amount to the progressive award based on matching a percentage of wagers placed, a predetermined amount for each game played, an elapsed period of time, or any other suitable manner.

In another embodiment, two or more of the progressive awards may be funded at different temporal rates. In this embodiment, the different progressive awards are incremented or funded in different increments of time wherein until the progressive hits, a set amount is added to the progressive at each determined time increment. In another embodiment, two or more of the progressive awards may each be incremented or funded based on different incrementing factors or incrementors. In this embodiment, a first of the progressive awards may increment each time a first incrementing factor occurs and a second of the progressive awards may increment each time a second incrementing factor occurs, wherein the first incrementing factor and the second incrementing factor are different. Examples of incrementing factors could be a symbol-driven trigger in the base game, the player betting a maximum amount, a percentage of possible gaming machines being actively played or in active status, or any other suitable method for defining an incrementor.

In one embodiment, one or more of the progressive awards are funded, at least partially, via a side-bet or side-wager which the player may make (and which may be tracked via a side-bet meter). In one embodiment, one or more of the progressive awards are funded with only side-bets or side-wagers placed. In another embodiment, one or more of the progressive awards are funded based on player's wagers as described above as well as any side-bets or side-wagers placed. In another embodiment, one or more progressive awards are funded, at least partially, via an amount provided by one or more marketing and/or advertising departments, such as a casino's marketing department.

In one alternative embodiment, a minimum wager level is required for a gaming machine to qualify to be selected to obtain one of the progressive awards. In one embodiment, this minimum wager level is the maximum wager level for the primary game in the gaming machine. In another embodiment, no minimum wager level is required for a gaming machine to qualify to be selected to obtain one of the progressive awards.

In one embodiment, the central server or other central controller determines when one or more progressive award wins are triggered. In this embodiment, a central controller and an individual gaming machine work in conjunction with each other to determine when a progressive award win is triggered, for example through an individual gaming machine meeting a predetermined requirement or criteria established by the central controller. In another embodiment, an individual gaming machine may determine when one or more progressive award wins are triggered. In another embodiment, an individual gaming machine may determine when at least one progressive award win is triggered and the central controller determines when at least one progressive award win is triggered.

In one embodiment, different gaming devices in the gaming system have different progressive awards available to a player. In one such embodiment, different types of gaming devices are associated with different types of progressive awards based on the current configuration of the gaming system. In one embodiment, zero, one or more progressive awards may be associated with each of the gaming devices in the gaming system while zero, one or more different progressive awards may be associated with a plurality of, but not all of the gaming devices in the gaming system.

In one embodiment, at least one and preferably a plurality of the progressive awards maintained by the gaming system are provided to players of the linked gaming machines in an apparently random fashion as perceived by the players of these gaming machines. These progressive awards are distinguished from the awards that the gaming machines provide to the players for displayed winning outcomes in the plays of the primary wagering games, such as slot games, card games (e.g., poker, blackjack) or any other suitable game.

In one embodiment, the gaming devices do not provide any apparent reasons to the players for obtaining such progressive awards. In this embodiment, providing the progressive awards is not triggered by a displayed event in the primary game or based specifically on any of the displayed plays of any primary game or on any of the displayed plays of any secondary game of the gaming machines in the system. That is, these progressive awards are provided to the players without any explanation or alternatively with simple explanations.

Group Bonus Events

Figure 3:
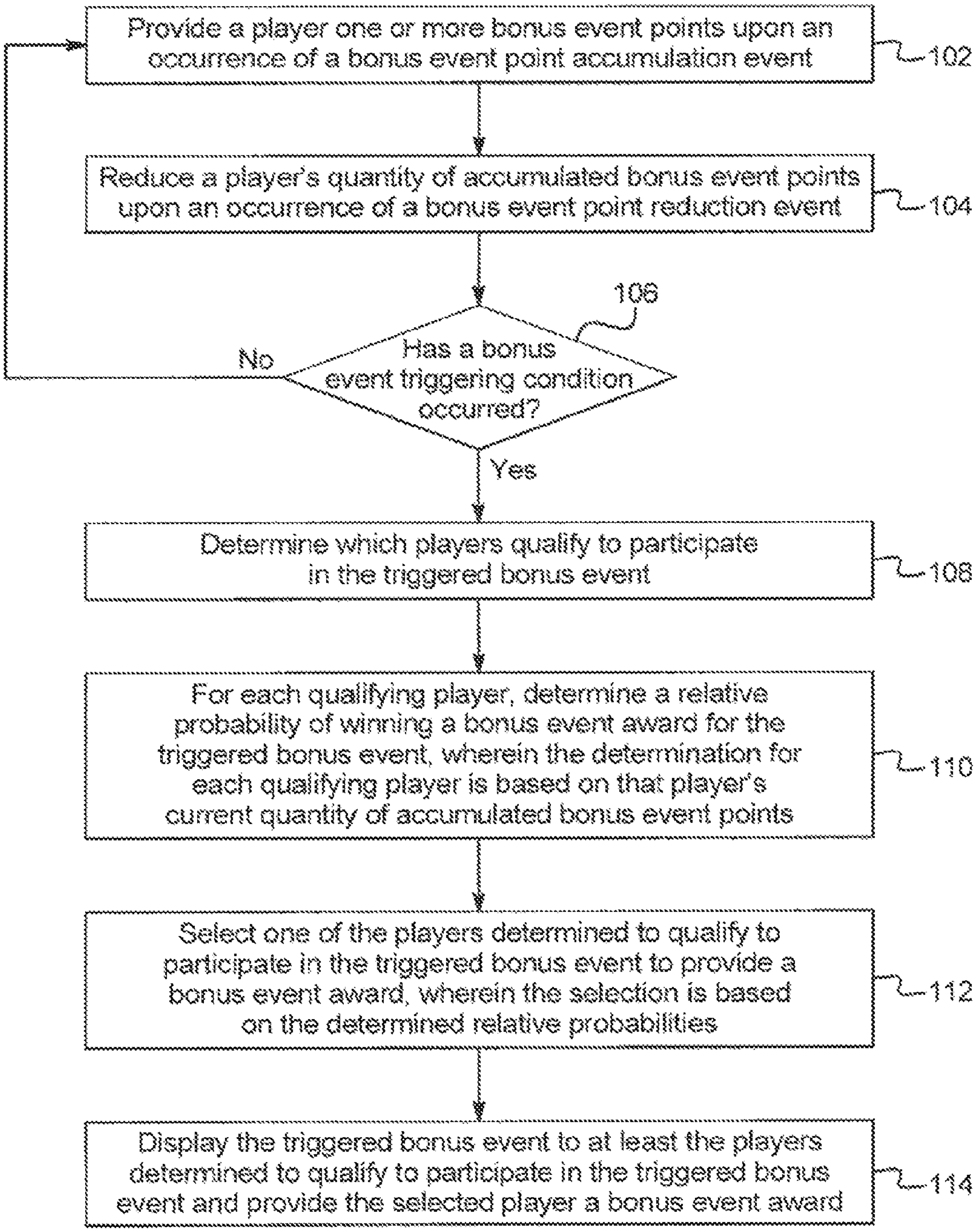
FIG. 3 is a flow-chart of one embodiment of the gaming system disclosed herein illustrating a player accumulating a quantity of bonus event points and the gaming system determining a player's relative probability of winning a bonus event award based on such accumulated bonus event points.

In one embodiment, the gaming system and method disclosed herein employs a point-based system to determine each individual player's probability to win a group bonus event award in a triggered group bonus event. Turning now to FIG. 3, in addition to enabling one or more players at one or more of the gaming devices to play one or more primary games (as described above), in one embodiment, the gaming system provides a player one or more bonus event points upon an occurrence of a bonus event point accumulation event as indicated in block 102. In one embodiment, a bonus event point accumulation event occurs if a player places a wager, such as a primary game wager or a side wager, that is at least a designated amount. In another embodiment, a bonus event point accumulation event occurs if a player places at least a designated amount of wagers over a designated period of time. In these embodiments, a player accumulates or otherwise earns bonus event points based on the wagers that player places and the frequency of placing such wagers. It should be appreciated that in one embodiment, the bonus event points disclosed herein are different, separate and independent from any monetary based points or credits, any promotional based points or credits, or any player tracking points. In other words, in this embodiment, the bonus event points disclosed herein are not directly redeemable for direct currency and are further not associated with a player's point balance in a player's player tracking account.

In one embodiment, if a bonus event point accumulation event occurs in association with a player, the quantity of bonus event points provided is based on that player's current wager. In another embodiment, if a bonus event point accumulation event occurs in association with a player, the quantity of bonus event points provided to the player is based on that player's wagers over a designated period of time. In these embodiments, the higher a player wagers and/or the more frequent that player places such wagers, the more bonus event points that player will accumulate or otherwise earn.

In addition to accumulating one or more bonus event points for a player upon the occurrence of a bonus event point accumulation event, icy one embodiment, the gaming system reduces a player's quantity of accumulated bonus event points upon an occurrence of a bonus event point reduction event as indicated in block 104. In one embodiment, a bonus event point reduction event occurs in association with a player (and the gaming system reduces the quantity of accumulated bonus event points for that player) every interval of a designated amount of time without a player placing a wager. In this embodiment, a player's quantity of accumulated bonus event points will deplete after a certain amount of time if the player has not placed a wager. For example, every five seconds that elapse without a player placing a wager, a bonus event point reduction event occurs and the gaming system reduces the quantity of accumulated bonus event points for that player. Accordingly, for each player, the gaming system may be increasing and decreasing the quantity of bonus event points based on different factors or aspects of the player's action, performance or other gaming experience.

Figure 4:
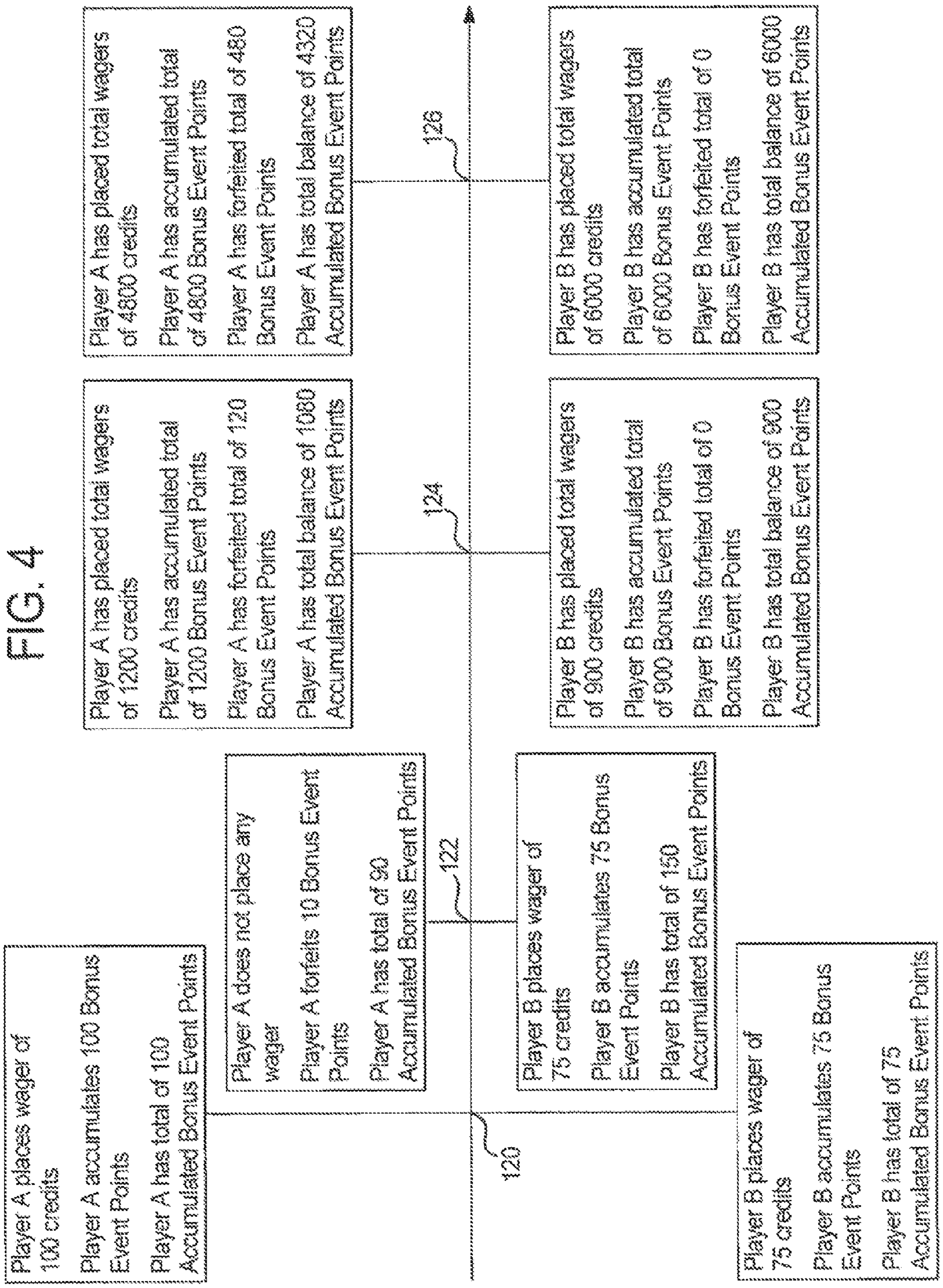
FIG. 4 is a timeline of one embodiment of the gaming system disclosed herein illustrating a plurality of bonus event point accumulation events and a plurality of bonus event point reduction events.

For example, as seen in FIG. 4, upon a first player (e.g., Player A) placing a wager of one-hundred credits (i.e., an occurrence of a bonus event point accumulation event) at a first point in time 120, the gaming system provides the first player one-hundred bonus event points. In this example, if the first player is betting one-hundred credits every five seconds and a player's quantity of accumulated bonus event points is reduced by ten bonus event points every three seconds without placing a wager (i.e., an occurrence of a bonus event point reduction event), then at a second point in time 122 that is three seconds after the first point in time, the gaming system reduces the first player's quantity of accumulated bonus event points by ten bonus event points. Accordingly, at the second point in time, the first player's balance of bonus event points is ninety bonus event points.

Continuing with this illustrated example, at a third point in time 124 which occurs one minute after the first point in time, the first player has accumulated one-thousand-two-hundred bonus event points (i.e., twelve bets of one-hundred credits each in this one minute) and the gaming system has reduced the first player's quantity of bonus event points by one-hundred-twenty bonus event points (i.e., twelve separate occurrences of three second intervals without a bet in this one minute). Thus, in the example, at this third point in time (i.e., for this one minute of gaming), the first player's balance of bonus event points is one-thousand-eighty bonus event points. Moreover, at a fourth point in time 126 which occurs three minutes after the third point in time, the first player has accumulated an additional three-thousand-six-hundred bonus event points (i.e., thirty-six bets of one-hundred credits each in this three minute period) and the gaming system has reduced the first player's quantity of accumulated bonus event points by an additional three-hundred-sixty bonus event points (i.e., thirty-six separate occurrences of three second intervals without a bet in this one three minute period). Thus, in the example, at this fourth point in time (for this four minutes of gaming), the first player has accumulated a total of four-thousand-eight hundred bonus event points, forfeited a total of four-hundred-eights bonus event points and the first player's balance of bonus event points is four-thousand-three-hundred-twenty bonus event points.

As also seen in FIG. 4, upon a second player (e.g., Player B) placing a wager of seventy-five credits (i.e., an occurrence of a bonus event point accumulation event) at the first point in time 120, the gaming system provides the second player seventy-five bonus event points. In this example, if the second player is betting seventy-five credits every three seconds and a player's quantity of accumulated bonus event points is reduced by ten bonus event points every three seconds without placing a wager (i.e., an occurrence of a bonus event point reduction event), then at the second point in time 122 that is three seconds after the first point in time, the second player places another wager of seventy-five credits (i.e., another occurrence of a bonus event point accumulation event) and the gaming system provides the second player another seventy-five bonus event points. It should be appreciated that since the second player is placing wagers at such a frequency, no bonus event point reduction events occur in association with the second player's wagering activity. Accordingly, at the second point in time, the second player's balance of bonus event points is one-hundred-fifty bonus event points.

As further seen in FIG. 4, at the third point in time 124 which occurs one minute after the first point in time, the second player has accumulated nine-hundred bonus event points (i.e., twenty bets of seventy-five credits each in this one minute) and the gaming system has reduced the player's quantity of accumulated bonus event points by zero bonus event points (i.e., no occurrences of three second intervals without a bet in this one minute). Thus, in the example, at this third point in time (i.e., for this one minute of gaming), the second player's balance of bonus event points is one-thousand-five-hundred bonus event points. Moreover, at the fourth point in time 126 which occurs three minutes after the third point in time, the second player has accumulated an additional four-thousand-five-hundred bonus event points (i.e., sixty bets of seventy-five credits each in this three minute period) and the gaming system has reduced the player's quantity of accumulated bonus event points by zero bonus event points (i.e., no occurrences of three second intervals without a bet in this one three minute period). Thus, in the example, at this fourth point in time (for this four minutes of gaming), the second player has accumulated a total of six-thousand bonus event points, forfeited a total of zero bonus event points and the second player's balance of bonus event points is six-thousand bonus event points.

It should be appreciated that as illustrated in this example, despite the first player wagering a higher amount per wager placed, the second player's frequency in placing wagers of a lower amount per wager results in the second player having a greater balance of bonus event points after a designated period of time. Accordingly, the gaming system disclosed herein maintains different balance of bonus event points for different players based on each player's respective amounts wagered and each player's respective frequency or rate of wagering, wherein each player's respective frequency or rate of wagering includes the frequency or rate of placing such wagers and the frequency or rate of not placing wagers.

In one embodiment, in addition to enabling one or more players to accumulate and forfeit bonus event points, the gaming system also determines if a bonus event triggering condition occurs as indicated in block 106 of FIG. 3. In one embodiment, a bonus event triggering condition occurs based on a displayed event in a play of one or more displayed games of one or more of the gaming devices in the gaining system. For example, a bonus event triggering condition occurs if a designated symbol or symbol combination is generated in a play of a primary game. In another embodiment, a bonus event triggering condition occurs independent of any displayed event in any play of any game of any of the gaming devices in the gaming system. In another embodiment, the gaming system tracks the occurrences of one or more suitable events occurring at or in association with one or more players and/or one or more gaming devices in the gaming system and determines, based on these tracked events, whether a bonus event triggering condition has occurred. In another embodiment, the gaming system defines one or more game play parameters, wherein each time a player's tracked game play activity satisfies the defined parameter, a bonus event triggering condition occurs.

In one embodiment, if the bonus event triggering condition has not occurred, the gaming system returns to block 102 and provides a player one or more bonus event points upon an occurrence of a bonus event point accumulation event or reduces the player's quantity of accumulated bonus event points upon an occurrence of a bonus event point reduction event as described above. On the other hand, if the bonus event triggering condition occurs, the gaming system determines which players qualify to participate in the triggered bonus event as indicated in block 108.

In one such embodiment, the gaming system determines that each player with at least one accumulated bonus event point qualifies to participate in the triggered bonus event. Thus, in this embodiment, each accumulated bonus event point represents a chance for a player to participate in a triggered group bonus event. In another such embodiment, the gaming system determines that each player with at least a designated balance of bonus event points qualifies to participate in the triggered bonus event.

After determining which players qualify to participate in the triggered bonus event, as indicated in block 110, the gaming system determines, for each player, a relative probability of winning a group bonus event award for the triggered bonus event, wherein the determination for each player is based on that player's current balance of bonus event points. In one such embodiment, the greater the current balance of bonus event points for a player, the greater that player's probability of winning a group bonus event award for the triggered bonus event. That is, the gaming system determines each player's probability of success in the triggered bonus event, wherein that player's determined probability of success is based on that player's current balance of bonus event points (which is based on that player's wagers placed and frequency of placing such wagers).

In one embodiment, to determine each player's relative probability of winning a group bonus event award for the triggered bonus event, the gaming system determines the total quantity of outstanding bonus event points for the players determined to qualify to participate in the triggered bonus event. In this embodiment, the gaming system then determines, for each of such players, that player's relative probability of winning a group bonus event award for the triggered bonus event based on that player's relative contribution to this total quantity of outstanding bonus event points. For example, as seen in FIG. 5, if the gaming system determines that five players (i.e., Player A, Player B, Player C, Player and Player E) each qualify to participate in the triggered bonus event, the gaming system determines that amongst these five there are ten-thousand accumulated bonus event points outstanding. Accordingly, for Player A, the gaming system determines that Player A contributed 2700 to this total of ten-thousand outstanding bonus event points and thus Player A's relative probability of winning a group bonus event award for the triggered bonus event is 27% (or 2,700/10,000). Similarly, for Player B, the gaming system determines that Player B contributed 4300 to this total of ten-thousand outstanding bonus event points and thus Player B's relative probability of winning a group bonus event award for the triggered bonus event is 43% (or 4,300/10,000).

In one embodiment, the triggered bonus event is a competitive bonus event, wherein each player's determined relative probability of winning a group bonus event award for the triggered bonus event is equated to a player's relative starting position for the triggered bonus event. That is, a player's current balance of bonus event points are converted into a displayed starting position for that player in the triggered bonus event. Accordingly, a player's wagers placed, a player's frequency of placing such wagers and a player's frequency of not placing any wagers correlates to a player's balance of bonus event points which correlates to an advantage to that player for the competitive bonus event.

Figure 6:
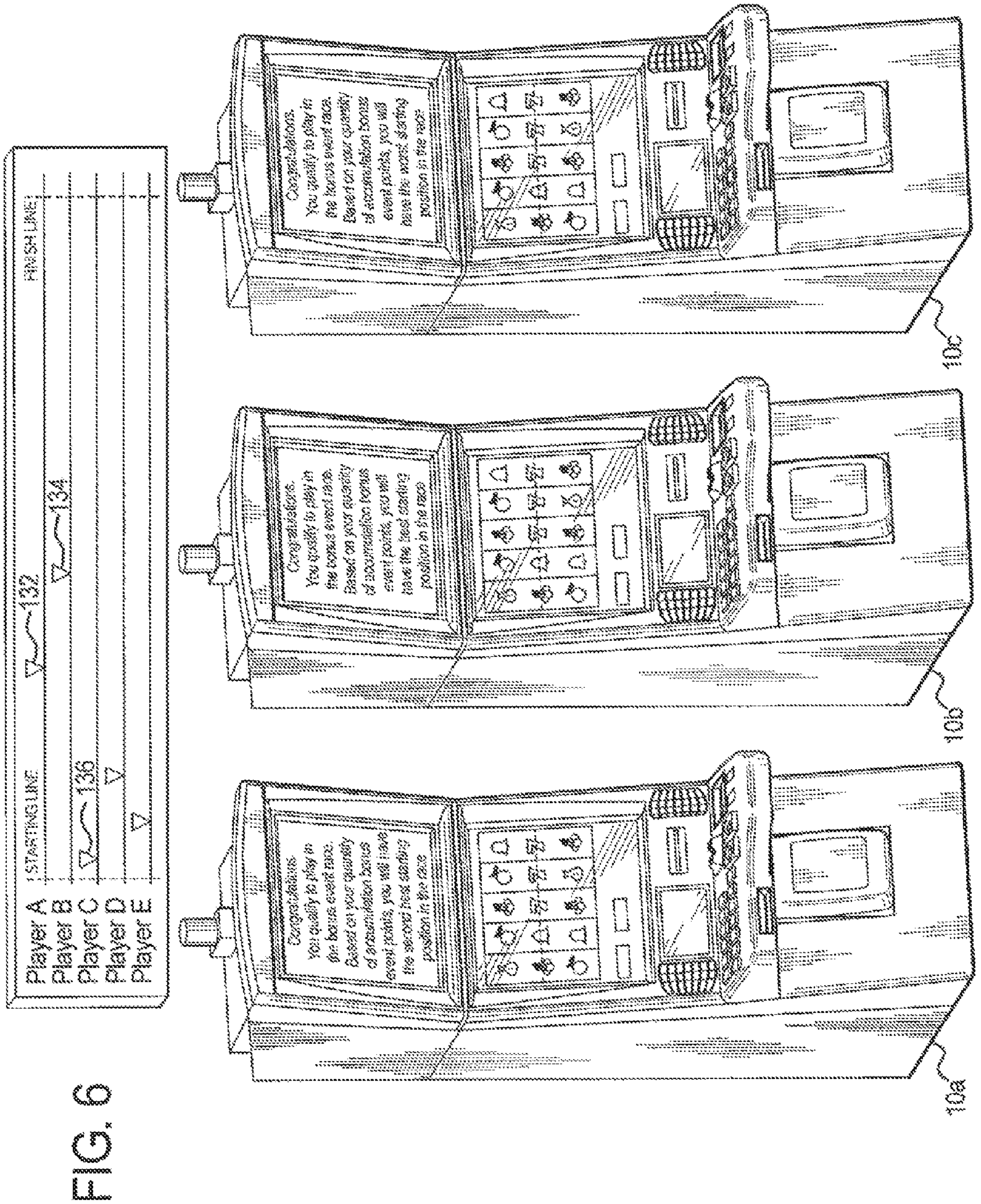
FIG. 6 is a schematic diagram of one embodiment of the gaming system disclosed herein illustrating a plurality of players each playing a group race bonus event.

In one such embodiment, the triggered bonus event is a group race bonus event, wherein each player's relative balance of bonus event points (i.e., each player's determined relative probability of winning a group bonus event award) correlates to that player's determined relative starting position in the group race bonus event. For example, as seen on the community display device 130 of FIG. 6 and following the example of FIG. 5, the gaming system determines that since Player A (currently playing gaming device 10*a*) has the second highest balance of bonus event points (and is determined to have the second highest relative probability of winning a group bonus event award), Player A is displayed at first starting position 132 in the group race bonus event. In this example, the gaming system also determines that since Player B (currently playing gaming device 10*b*) has the highest balance of bonus event points (and is determined to have the highest relative probability of winning a group bonus event award), Player B is displayed at a second starting position 134 in the group race bonus event (which provides Player B a greater advantage in the group race bonus event than Player A). Additionally, the gaming system determines that since Player C (currently playing gaming device 10*c*) has the lowest balance of bonus event points (and is determined to have the lowest relative probability of winning a group bonus event award), Player C is displayed at the last starting position 135 in the group race bonus event.

In another embodiment, the triggered bonus event is a competitive bonus event, wherein each player's determined relative probability of winning a group bonus event award for the triggered bonus event is equated to a player's relative ending position for the triggered bonus event. That is, a player's wagers placed, a player's frequency of placing such wagers and a player's frequency of not placing any wagers correlates to a player's balance of bonus event points which correlates to a relative ending position for the triggered bonus event (i.e., an advantage to that player for the competitive bonus event).

In another embodiment (not shown) the triggered bonus event is a group accumulation bonus event, wherein each player's relative balance of bonus event points each player's determined relative probability of winning a group bonus event award) correlates to that player's relative starting accumulation value in the group accumulation bonus event. For example, in a group accumulation bonus event, a group bonus event award is provided to the first player that accumulates one-thousand bonus symbols during a free spin sequence. Following the example of FIG. 5, the gaming system determines that since Player B has the highest balance of bonus event points (and is determined to have the highest relative probability of winning a group bonus event award), Player B begins the group accumulation bonus event with four-hundred-thirty bonus symbols (which are displayed to Player B). Additionally, the gaming determines that since Player C has the lowest balance of bonus event points (and is determined to have the lowest relative probability of winning a group bonus event award), Player C begins the group accumulation bonus event with thirty bonus symbols (which are displayed to Player C).

After determining each player's relative probability of winning a group bonus event award for the triggered bonus event, as indicated in block 112 of FIG. 3, the gaming system selects, based at least in part on the determined relative probabilities, one of the players determined to qualify to participate in the triggered bonus event to provide a group bonus event award. In one such embodiment, the gaming system causes one or more random determinations to occur for each player in the triggered bonus event wherein each player's determined and displayed relative starting position coupled with the results of such random generations for that player determine which player is selected to win the group bonus event award. Accordingly, such an embodiment provides that the player's relative level of game play (i.e., a player's frequency of placing one or more wagers and the amounts of such wagers) at least in part influences if that player wins a group bonus event award.

As indicated in block 114, the gaming system displays the triggered bonus event to at least the players determined to qualify to participate in the triggered bonus event and provides the selected player a group bonus event award, such as a progressive award. Following the example of FIG. 5, the gaming system determines that Player A (with the second highest balance of bonus event points and the second greatest chance of winning a group bonus event award) is selected to win a group bonus event award. In this example, the gaming system displays the triggered bonus event to the players and provides Player A a group bonus event award. In another embodiment, the gaming system provides a plurality of group bonus event awards to a plurality of players participating in the group bonus event, wherein each player's probability of winning one or more of the group bonus event awards is based, at least in part, on that player's balance of bonus event points.

In one embodiment, the triggered bonus event includes a plurality of bonus event awards, such as progressive awards, wherein each bonus event award is ranked or organized in a plurality of tiers or levels. In one such embodiment, if a player is determined to win a bonus event award (in a competitive group bonus event or in an individual bonus event, such as a secondary game as described above), the bonus event award provided to that player is based on that player's balance of bonus event points. For example, a bonus event is associated with a multi-level progressive award that includes four progressive award levels. In this example, any player that has a current balance of bonus event points of less than one-hundred bonus event points is assigned to a first or lowest progressive award level, any player that has a current balance of bonus event points that includes one-hundred to three-hundred-ninety-nine bonus event points is assigned to a second progressive award level, any player that has a current balance of bonus event points that includes four-hundred to nine-hundred-ninety-nine bonus event points is assigned to third progressive award level and any player that has a current balance of bonus event points of more than one-thousand bonus event points is assigned to a fourth or highest progressive award level.

In another such embodiment, if a player is determined to win a bonus event award (in a competitive group bonus event or in an individual bonus event, such as a secondary game as described above), the bonus event awards which the player is eligible to win is based on that player's balance of bonus event points. In this embodiment, the gaming system determines, based on the player's balance of bonus event points, a starting bonus event award level, wherein the player may move up additional bonus event award levels to win greater bonus event awards. These embodiments provide that players with higher balances of bonus event points (i.e., players that placed higher relative wager amounts and/or placed such wagers at higher relative frequencies) play for and may subsequently win higher progressive awards.

In one embodiment, upon a bonus event triggering condition, the gaming system accumulates a quantity of bonus event points for the player associated with triggering the bonus event. In this embodiment, as a player's quantity of accumulated bonus event points determines that player's probability of success in the bonus event, providing a player associated with triggering the bonus event with an additional quantity of bonus event points increases that player's probability of success in the bonus event.

In one embodiment, a bonus event point accumulation event occurs during a player's play of a primary wagering game. In another embodiment, a bonus event point accumulation event occurs during a player's play of a primary wagering game or during a player's play of a triggered bonus event. In this embodiment, the gaming system enables a player to accumulate bonus event points during the player's participation in the triggered bonus event wherein such accumulated bonus event points may increase the player's probability of winning a group bonus event award.

In one embodiment, a bonus event point accumulation event occurs in association with a player (or in association with a gaming device) based on a displayed event in a play of one or more displayed games of a gaming device. In another embodiment, a bonus event point accumulation event occurs in association with a player (or in association with a gaming device) independent of any displayed event in any play of any game of a gaming device. In another embodiment, the gaming system tracks the occurrences of one or more suitable events occurring at or in association with one or more players and/or one or more gaming devices in the gaming system and determines, based on these tracked events, whether a bonus event point accumulation event has occurred. In another embodiment, the gaming system defines one or more game play parameters, wherein each time a player's tracked game play activity satisfies the defined parameter, a bonus event point accumulation event occurs. In another embodiment, a bonus event point accumulation event occurs if a player wagers at least a designated amount over a designated amount of time (i.e., the player is playing at at least a certain rate). In another embodiment, a bonus event point accumulation event occurs in association with a player regardless of if that player is or is not placing a wager. In different embodiments, the determination of whether a bonus event point accumulation event occurs is predetermined, randomly determined, determined based on a player's status (such as determined through a player tracking system), determined based on a generated symbol or symbol combination, determined based on a random determination by the central controller, determined based on a random determination at the gaming machine, determined based on time (such as the time of day), determined based on an amount of coin-in accumulated in one or more pools or determined based on any other suitable method or criteria.

In one embodiment, if a bonus event point accumulation event occurs, the quantity of bonus event points provided to the player is based on a displayed event in a play of one or more displayed games of one or more of the gaming devices in the gaming system. In another embodiment, if a bonus event point accumulation event occurs, the quantity of bonus event points provided to the player is independent of any displayed event in any play of any game of any of the gaming devices in the gaming system. In different embodiments, if a bonus event point accumulation event occurs, the quantity of bonus event points provided to the player is predetermined, randomly determined, determined based on a player's status (such as determined through a player tracking system), determined based on a generated symbol or symbol combination, determined based on a random determination by the central controller, determined based on a random determination at the gaming machine, determined based on time (such as the time of day), determined based on an amount of coin-in accumulated in one or more pools or determined based on any other suitable method or criteria.

In one embodiment, there is a direct relationship (i.e., a one to one ratio) between an amount of a wager and an amount of bonus event points provided upon an occurrence of a bonus event point accumulation event. For example, if a first player wagers ten credits on a play of a primary game, a second player wagers fifty credits on a play of a primary game and a bonus event point accumulation event for each player, the first player is provided ten bonus event points and the second player is provided fifty bonus event points. In another such embodiment, there is an indirect relationship (i.e., a many to one or one to many ratio) between an amount of a wager and an amount of bonus event points provided upon an occurrence of a bonus event point accumulation event. For example, if a first player wagers ten credits on a play of a primary game, a second player wagers fifty credits on a play of a primary game, bonus event points are provided based on a five credits to one bonus event point ratio and a bonus event point accumulation event for each player, the first player is provided two bonus event points and the second player is provided ten bonus event points.

In one embodiment, different players of different player ranking statuses are each provided a different quantity of bonus event points upon an occurrence of a bonus event point accumulation event. For example, if a bonus event point accumulation event occurs, a gold level player is provided one bonus event point for placing a designated amount of wagers and a platinum level player is provided five bonus event points upon placing the same designated amount of wagers.

In one embodiment as described herein, if a bonus event point accumulation event occurs, the gaming system accumulates one or more bonus event points (and maintains such accumulated bonus event points) for the specific player at the gaming device associated with the bonus event point accumulation event. In this embodiment, such accumulated bonus event points are associated with the player and may be transferred from gaming device to gaming device. In one such embodiment, the gaming system accumulates a number of bonus event points for the player by storing the accumulated number of bonus event points in association with the player's identification card or player tracking card. In another such embodiment, the gaming system accumulates a number of bonus event points for the player by storing the accumulated number of bonus event points in association with a ticket or voucher. In this embodiment, if the player inserts the ticket or voucher into the note, ticket or bill acceptor of one of the gaming devices in the gaming system, that gaming device reads the ticket or voucher and enables the player to access any bonus event points accumulated for that player. Such embodiments enable the player to access any stored bonus event points and accumulate additional bonus event points at a plurality of different gaming devices.

In another embodiment, if a bonus event point accumulation event occurs, the gaming system accumulates one or more bonus event points (and maintains such accumulated bonus event points including reducing the balance of any accumulated bonus event points upon an occurrence of a bonus event point reduction event) for the gaming device associated with the bonus event point accumulation event. In this embodiment, such accumulated bonus event points are associated with the gaming device and independent of which player may be playing the gaming device at any given point in time.

In another embodiment, the gaming system enables one or more players to buy one or more bonus event points. In one such embodiment, a player buys one or more bonus event points using an amount of credits. In another embodiment, a player buys one or more bonus event points using an amount of player tracking points.

In another embodiment, one or more accumulated bonus event points are associated with an expiration date and time. In this embodiment, the gaming system is configured to communicate to the player the proximity of the expiration of any accumulated bonus event points (i.e., "your bonus event points will expire at 6:00 am tomorrow"). In one embodiment, such notice of expiration of any accumulated bonus event points is at the player's currently played gaming device. In another embodiment, such notice of expiration of any accumulated bonus event points is external from the player's currently played gaming device, such as via e-mail. In different embodiments, if multiple bonus event points are accumulated in associated with a player's account, the use of accumulated stored bonus event points are provided to the player in order of expiration (first to expire shows first), in order of first earned basis.

In another embodiment, a bonus event point reduction event occurs in association with a player (and the gaming system reduces the quantity of accumulated bonus event points for that player) every interval of a designated amount of time. For example, every five seconds a bonus event point reduction event occurs and the gaming system reduces the quantity of accumulated bonus event points for a player. In another embodiment, a bonus event point reduction event occurs in association with a player (and the gaming system reduces the quantity of accumulated bonus event points for that player) every interval of a designated amount of time if the player does not place a wager after a predefined amount of time. For example, every two seconds that elapse without a player placing a wager (after ten seconds have elapsed without the player placing a wager), a bonus event point reduction event occurs and the gaming system reduces the quantity of accumulated bonus event points for that player. In another embodiment, a bonus event point reduction event occurs in association with a player (and the gaming system reduces the quantity of accumulated bonus event points for that player) every interval of a designated amount of time without a player placing at least a designated wager. For example, every five seconds that elapse without a player placing a wager of at least three credits, a bonus event point reduction event occurs and the gaming system reduces the quantity of accumulated bonus event points for that player.

In another embodiment, a bonus event point reduction event occurs based on a displayed event in a play of one or more displayed games of one or more of the gaming devices in the gaming system. In another embodiment, a bonus event point reduction event occurs independent of any displayed event in any play of any game of any of the gaming devices in the gaming system. In another embodiment, the gaming system tracks the occurrences of one or more suitable events occurring at or in association with one or more players and/or one or more gaming devices in the gaming system and determines, based on these tracked events, whether a bonus event point reduction event has occurred. In another embodiment, the gaming system defines one or more game play parameters, wherein each time a player's tracked game play activity satisfies the defined parameter, a bonus event point reduction event occurs. In another embodiment, a bonus event point reduction event occurs in association with a player regardless of if that player is or is not placing a wager. In different embodiments, the determination of whether a bonus event point reduction event occurs is predetermined, randomly determined, determined based on a player's status (such as determined through a player tracking system), determined based on a generated symbol or symbol combination, determined based on a random determination by the central controller, determined based on a random determination at the gaming machine, determined based on one or more side wagers placed, determined based on the player's primary game wager, determined based on time (such as the time of day), determined based on an amount of coin-in accumulated in one or more pools or determined based on any other suitable method or criteria.

In one embodiment, if a bonus event point reduction event occurs in association with a player, the quantity of reduced bonus event points reduced is based on that player's current wager. In another embodiment, if a bonus event point reduction event occurs in association with a player, the quantity of reduced bonus event points to the player is based on that player's wagers over a designated period of time. In these embodiments, the quantity of reduced bonus event points is based on the wagers that player places and the frequency of placing such wagers.

In one embodiment, for different players wagering different amounts, the gaming system causes one or more bonus event point reduction events to occur for such different players at the same rates of occurrence. In another embodiment, for different players wagering different amounts, the gaming system causes one or more bonus event point reduction events to occur for such different players at different rates of occurrence. In another embodiment, for different players wagering different amounts, upon an occurrence of a bonus event point reduction event, the gaming system reduces each player's quantity of accumulated bonus event points by the same amount. In another embodiment, for different players wagering different amounts, upon an occurrence of a bonus event point reduction event, the gaming system reduces each player's quantity of accumulated bonus event points by different amounts.

In one embodiment, for different players of different player tracking statuses, the gaming system causes one or more bonus event point reduction events to occur for such different players at the same rates of occurrence. In another embodiment, for different players of different player tracking statuses, the gaming system causes one or more bonus event point reduction events to occur for such different players at different rates of occurrence. In another embodiment, for different players of different player tracking statuses, upon an occurrence of a bonus event point reduction event, the gaming system reduces each player's quantity of accumulated bonus event points by the same amount. In another embodiment, for different players of different player tracking statuses, upon an occurrence of a bonus event point reduction event, the gaming system reduces each player's quantity of accumulated bonus event points by different amounts.

In one embodiment, for different players playing at different gaming devices, the gaming system causes one or more bonus event point reduction events to occur for such players at the same rates of occurrence. In another embodiment, for different players playing at different gaming devices, the gaming system causes one or more bonus event point reduction events to occur for such players at different rates of occurrence. In another embodiment, for different players playing at different gaming devices, upon an occurrence of a bonus event point reduction event, the gaming system reduces each player's quantity of accumulated bonus event points by the same amount. In another embodiment, for different players playing at different gaming devices, upon an occurrence of a bonus event point reduction event, the gaming system reduces each player's quantity of accumulated bonus event points by different amounts.

In another embodiment, an occurrence of a bonus event point accumulation event for one player corresponds to an occurrence of a bonus event point reduction event for at least another player at another gaming device in the gaming system. In one such embodiment, every wager placed by a first player causes a bonus event point accumulation event for that first player and a bonus event point reduction event for at least a second player and every wager placed by the second player causes a bonus event point accumulation event for the second player and causes a bonus event point reduction event for at least the first player.

In another embodiment, if a bonus event point reduction event occurs in association with a player, the gaming system causes the player to lose or forfeit a predetermined percentage of any of that player's accumulated bonus event points. For example, every three seconds that occurs without a player placing a wager, a bonus event point reduction event occurs and the player forfeits 10% of their accumulated bonus event points. In another example, every ten seconds that occurs without a player placing a wager, a bonus event point reduction event occurs and the player forfeits 90% of their accumulated bonus event points. In another embodiment, the greater the player's quantity of accumulated bonus event points, the greater the percentage of that player's accumulated bonus event points that are forfeited with each occurrence of a bonus event point reduction event. In another embodiment, the greater the player's quantity of accumulated bonus event points, the lower the percentage of that player's accumulated bonus event points that are forfeited with each occurrence of a bonus event point reduction event. In different embodiments, for one or more occurrence of a bonus event point reduction event, the percentage of a player's accumulated bonus event points the gaming system causes to be forfeited is predetermined, randomly determined, determined based on the player's status (such as determined through a player tracking system), determined based on a generated symbol or symbol combination, determined based on a random determination by the central controller, determined based on a random determination at the gaming machine, determined based on one or more side wagers placed, determined based on the player's primary game wager, determined based on time (such as the time of day), determined based on an amount of coin-in accumulated in one or more pools or determined based on any other suitable method or criteria.

In another embodiment, if a bonus event point reduction event occurs in association with a player, the gaming system causes the player to lose or forfeit a designated quantity of accumulated bonus event points. In one such embodiment, this designated quantity of accumulated bonus event points is all of the player's accumulated bonus event points. In another embodiment, the greater the player's quantity of accumulated bonus event points, the greater the designated quantity of that player's accumulated bonus event points that are forfeited with each occurrence of a bonus event point reduction event. In another embodiment, the greater the player's quantity of accumulated bonus event points, the lower the designated quantity of that player's accumulated bonus event points that are forfeited with each occurrence of a bonus event point reduction event. In different embodiments, for one or more occurrences of a bonus event point reduction event, the quantity of bonus event points forfeited by the player is predetermined, randomly determined, determined based on the player's status (such as determined through a player tracking system), determined based on a generated symbol or symbol combination, determined based on a random determination by the central controller, determined based on a random determination at the gaming machine, determined based on one or more side wagers placed, determined based on the player's primary game wager, determined based on time (such as the time of day), determined based on an amount of coin-in accumulated in one or more pools or determined based on any other suitable method or criteria.

In one embodiment, a bonus event point reduction event does not occur if the player is viewing one or more help screens displayed by the gaming device and/or a designated amount of credits are currently on the gaming device. In another embodiment, a modified bonus event point reduction event occurs (which reduces the player's quantity of bonus event points by a lower amount than other bonus event point reduction events occurring) if the player is viewing one or more help screens displayed by the gaming device and/or a designated amount of credits are currently on the gaming device. In another embodiment, a bonus event point reduction event occurs less frequently (e.g., every thirty seconds without the player placing any wagers compared to every ten seconds of other bonus event point reduction events) if the player is viewing one or more help screens displayed by the gaming device and/or a designated amount of credits are currently on the gaming device.

In one embodiment, if a player at a gaming device wins a play of a game and is provided an award, a bonus event point reduction event does not occur during the period of time which the credit meter increments to reflect this provided award. In another embodiment, if a player at a gaming device wins a play of a game and is provided an award, a modified bonus event point reduction event occurs (which reduces the player's quantity of bonus event points by a lower amount than other bonus event point reduction events occurring). In another embodiment, if a player at a gaming device wins a play of a game and is provided an award, a bonus event point reduction event occurs less frequently.

In another embodiment, the gaming system determines which players qualify to participate in the triggered bonus event based on each player's status (determined via a player tracking system). For example, if a bonus triggering condition occurs, the gaming system determines that platinum level players qualify to participate in the triggered bonus event while gold level players do not qualify to participate. In another embodiment, the gaming system determines which players qualify to participate in the triggered bonus event based on each player's status (determined via a player tracking system) and each player's current balance of bonus event points. For example, if a bonus triggering condition occurs, the gaming system determines that platinum level players with a current balance of at least five bonus event points qualify to participate in the triggered bonus event and gold level players with a current balance of at least ten bonus event points qualify to participate in the triggered bonus event. In different embodiments, the determination of which player's qualify to participate in a triggered bonus event is predetermined, randomly determined, determined based on a generated symbol or symbol combination, determined based on a random determination by the central controller, determined based on a random determination at the gaming machine, determined based on one or more side wagers placed, determined based on the player's primary game wager, determined based on time (such as the time of day), determined based on an amount of coin-in accumulated in one or more pools or determined based on any other suitable method or criteria.

In another embodiment, if a bonus event triggering condition occurs, the gaming system enables each player at each gaming device to participate in the triggered bonus event. That is, the gaming system determines that each gaming device is a participating gaming device for the triggered bonus event. In another embodiment, if a bonus event triggering condition occurs, the gaming system causes each of the currently active gaming devices to participate in the triggered bonus event. In this embodiment, the gaming system determines the status of the gaming devices and provides each gaming device which is in active status a chance to participate in the bonus event. In this embodiment, upon the triggering of a bonus event (i.e., the occurrence of a bonus event triggering condition), each gaming device is determined to be in either active status or enrolled or inactive status. Active status means that the gaming device is being actively played by a player, wherein the active status requirements can be based on any suitable number of satisfied criteria or defined in any suitable manner by the implementer of the gaming system. For example, the current level of a gaming device's accumulated wager meter (i.e., is an accumulated wager meter at or above a designated threshold wager level) may be part of the determination of whether that gaming device is in the active status. In another example, a play of or wager on the primary game of the gaming device within a predetermined period of time may be part of the determination of whether that gaming device is in the active status. Other factors such as: (a) the amount of time between each play of or wager on the primary game of the gaming device; (b) the amount being wagered on the primary game(s); and (c) the number of plays within a period of time, may also or alternatively be part of the determination of whether a gaming device is in the active status. On the other hand, inactive status means that the gaming device is not in the active status not being actively played by a player according to one or more of the predetermined criteria).

In another embodiment, if the bonus event triggering condition occurs, the gaming system triggers a bonus event for each player with a wagering activity history that meets a threshold of wagering activity history. In another embodiment, a plurality of players are enabled to form a group of players and if the bonus event triggering condition occurs for one of the players in the formed group of players, the gaming system triggers a bonus event for each of the players in the formed group of players. In another embodiment, the gaming system forms one or more groups of players and if the bonus event triggering condition occurs for one of the players in a formed group of players, the gaming system triggers a bonus event for each of the players in that formed group of players. In this embodiment, the gaming system forms such groups of players based on any suitable criteria. In different embodiments, if the bonus event triggering condition occurs, the determination of which players at which gaming devices participate in the bonus event is predetermined, randomly determined, determined based on each player's status (such as determined through a player tracking system), determined based on one or more generated symbols or symbol combinations, determined based on one or more random determinations by the central controller, determined based on one or more random determinations at one or more of the gaming machines, determined based on one or more side wagers placed, determined based on each player's primary game wager, determined based on time (such as the time of day), determined based on an amount of coin-in accumulated in one or more pools or determined based on any other suitable method or criteria.

In one embodiment, to determine each player's relative probability of whining a group bonus event award for the triggered bonus event, the gaming system utilizes that player's current balance of bonus event points and one or more factors related to that player's action, performance or other gaming experience. In one such embodiment, the gaming system determines each player's relative probability of winning a group bonus event award for the triggered bonus event based on that player's current balance of bonus event points and that player's current wager. In another such embodiment, the gaming system determines each player's relative probability of winning a group bonus event award for the triggered bonus event based on that player's current balance of bonus event points and that player's player tracking status. In different embodiments, the gaming system determines each player's relative probability of winning a group bonus event award for the triggered bonus event based on that player's current balance of bonus event points and at least one determination which is predetermined, randomly determined, determined based on a generated symbol or symbol combination, determined based on a random determination by the central controller, determined based on a random determination at the gaming machine, determined based on one or more side wagers placed, determined based on time (such as the time of day), determined based on an amount of coin-in accumulated in one or more pools or determined based on any other suitable method or criteria.

It should be appreciated that any suitable primary game and/or any suitable secondary game may be incorporated as a triggered bonus event disclosed herein. In different embodiments, a triggered bonus event may incorporate any of the types of games described herein, as well as any suitable puzzle-type game, any suitable persistence game, any suitable wheel game, any suitable selection game, any suitable offer and acceptance game, any suitable cascading symbols game, any suitable ways to win game, any suitable scatter pay game, any suitable group game or any other suitable type of game. In different embodiments, the type of game utilized for a triggered bonus event is predetermined, randomly determined, determined based on the player's status (such as determined through a player tracking system), determined based on a generated symbol or symbol combination, determined based on a random determination by the central controller, determined based on a random determination at the gaming machine, determined based on one or more side wagers placed, determined based on the player's primary game wager, determined based on time (such as the time of day), determined based on an amount of coin-in accumulated in one or more pools or determined based on any other suitable method or criteria. In different embodiments, the characteristics or features of each triggered bonus event is predetermined, randomly determined, determined based on the player's status (such as determined through a player tracking system), determined based on a generated symbol or symbol combination, determined based on a random determination by the central controller, determined based on a random determination at the gaming machine, determined based on one or more side wagers placed, determined based on a player's primary game wager, determined based on time (such as the time of day), determined based on an amount of coin-in accumulated in one or more pools or determined based on any other suitable method or criteria.

Figure 7:
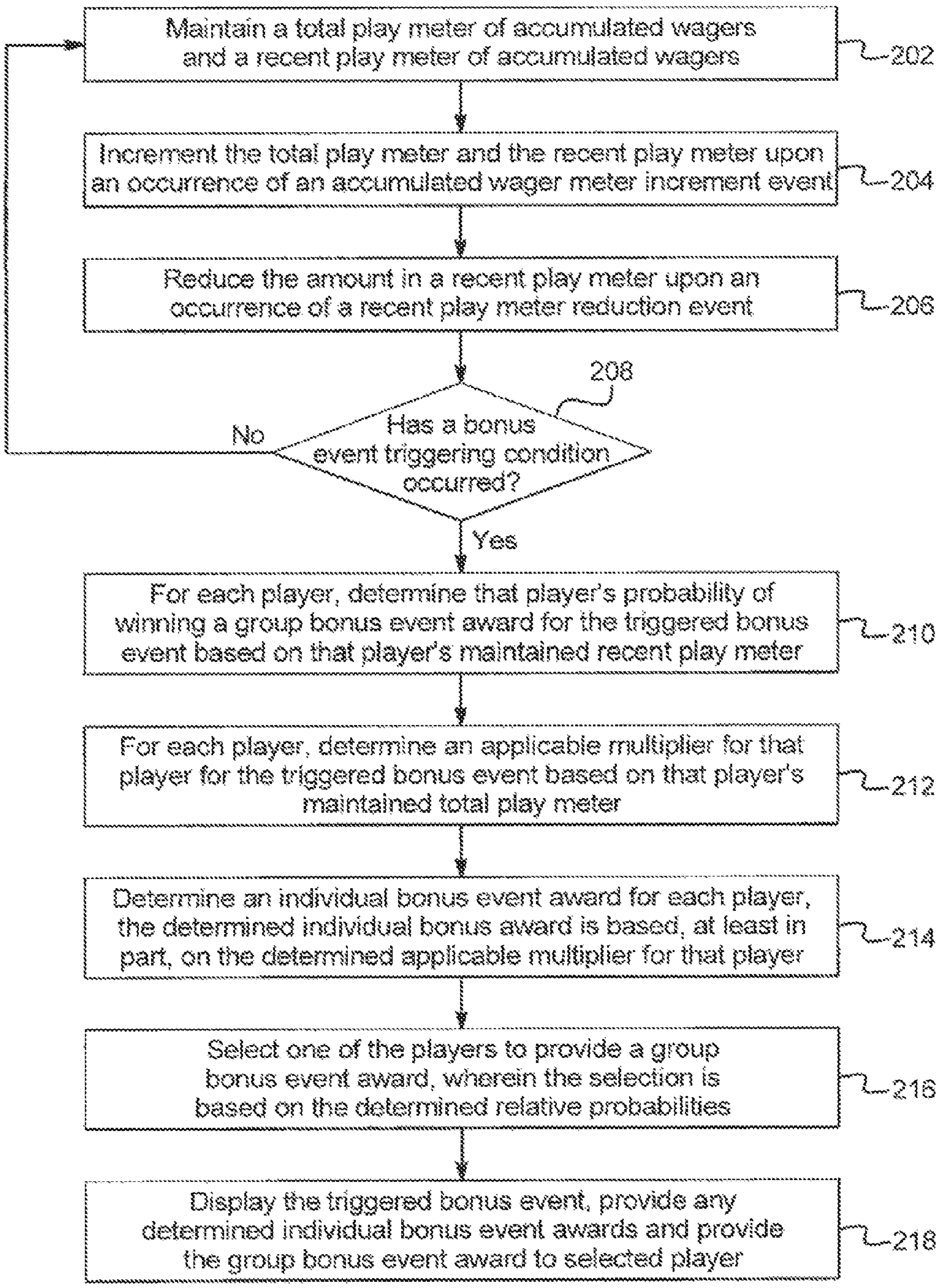
FIG. 7 is a flow-chart of one embodiment of the gaming system disclosed herein illustrating a total play accumulated wager meter, a recent play accumulated wager meter and a player's probability of winning a bonus event award based on that player's recent play accumulated wager meter.

Turning now to FIG. 7, in another embodiment, the gaming system and method disclosed herein employs a multiple pool-based or multiple meter-based system to determine each individual player's probability to win a group bonus event award in a triggered bonus event. In this embodiment, for each player, the gaming system maintains a plurality of individual accumulated wager meters or accumulated wager pools. For each player, the gaming system maintains a first or total play meter of accumulated wagers and a second or recent play meter of accumulated wagers as indicated in block 202. As described below, the maintained total play accumulated wager meter and the recent play accumulated wager meter are both utilized in a triggered bonus event to each determine one or more factors or aspects of the bonus event provided for that player.

In one embodiment, in addition to enabling one or more players at one or more of the gaming devices to play one or more primary games (as described above), for each player, the gaming system increases or increments the maintained first or total play accumulated wager meter and the maintained second or recent play accumulated wager meter upon an occurrence of an accumulated wager meter increment event as indicated in block 204. In one embodiment, an accumulated wager meter increment event occurs if a player places a wager, such as a primary game wager or a side wager. In this embodiment, each player is associated with a separate total play meter and a separate recent play meter, wherein each separate total play meter and each separate recent play meter is individually tracked or accounted for as a percentage of the total or partial amounts wagered by that player. This configuration provides that the total play meter and the recent play meter are both incremented or increased based on the wagers a player places and the frequency of placing such wagers.

In one embodiment, if an accumulated wager meter increment event occurs in association with a player, the amount the total play meter and/or the recent play meter is increased is based on that player's current wager. In another embodiment, if an accumulated wager meter increment event occurs in association with a player, the amount the total play meter and/or the recent play meter is increased is based on that player's wagers over a designated period of time. In these embodiments, the higher a player wagers and the more frequent that player places such wagers, the higher the amount that the total play meter and/or the recent play meter will increase.

In addition to increasing the total play meter and the recent play meter for a player upon the occurrence of an accumulated wager meter increment event, in one embodiment, the gaming system reduces the amount in a player's recent play meter upon an occurrence of a recent play meter reduction event as indicated in block 206. Accordingly, for each player, the gaming system may be increasing the amount in that player's maintained total play accumulated wager meter, increasing the amount in that player's maintained recent play accumulated wager meter and decreasing the amount in that player's maintained recent play accumulated wager meter based on different factors or aspects of the player's action, performance or other gaming experience.

In one embodiment, a recent play meter reduction event occurs in association with a player (and the gaming system reduces the amount in that player's maintained recent play meter) every interval of a designated amount of time. In another embodiment, a recent play meter reduction event occurs in association with a player (and the gaming system reduces the amount in that player's maintained recent play meter) every interval of a designated amount of time without a player placing a wager. In this embodiment, the amount in a player's maintained recent play meter will deplete after a certain amount of time if the player has not placed a wager. In another embodiment, a recent play meter reduction event occurs in association with a player (and the gaming system reduces the amount in that player's maintained recent play meter) every interval of a designated amount of time without a player placing at least a designated wager. That is, a player's wagers placed, a player's frequency of placing such wagers and a player's frequency of not placing any wagers correlates the current amount in a player's maintained recent play accumulated wager meter.

Figure 8:
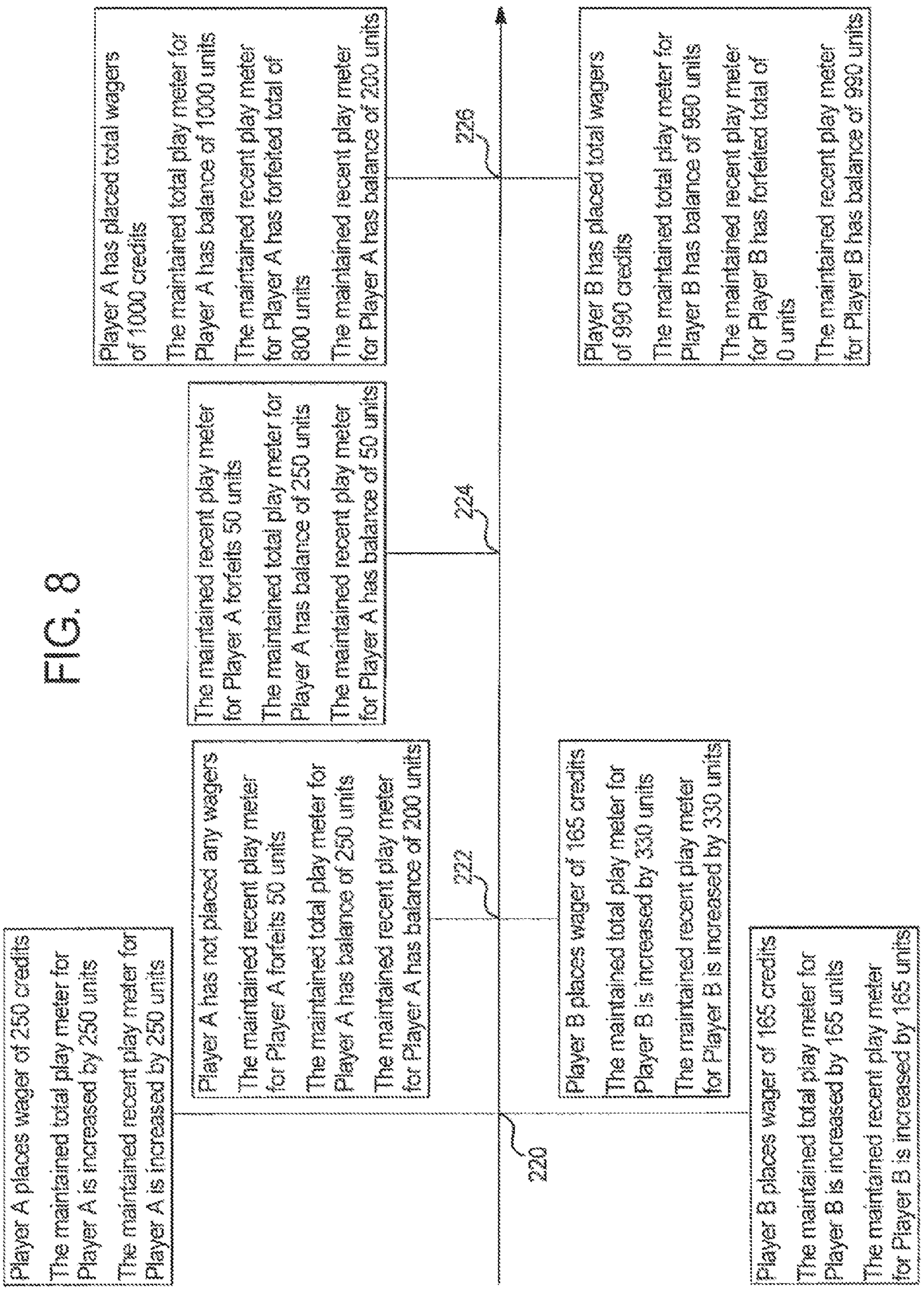
FIG. 8 is a timeline of one embodiment of the gaming system disclosed herein illustrating a plurality of total play accumulation wager pool increase events and a plurality of recent play accumulated wager meter reduction events.

For example, as seen in FIG. 8, upon a first player (e.g., Player A) placing a wager of two-hundred-fifty credits (i.e., an occurrence of an accumulated wager meter increment event) at a first point in time 220, the gaming system increases the maintained total play meter and the maintained recent play meter for the first player by two-hundred-fifty units or credits. In this example, if the first player is betting two-hundred-fifty credits every fourteen seconds and a player's recent play meter is reduced by fifty credits or units every second after ten seconds without placing a wager (i.e., an occurrence of a recent play meter reduction event), then at a second point in time 222 that is ten seconds after the first point in time, the gaming system reduces the first player's recent play meter by fifty units. Accordingly, at the second point in time, the first player has a total of two-hundred-fifty units in the total play meter and two-hundred units in the first player's maintained recent play meter. In this example, the gaming system continues causing recent play meter reduction events to occur and continues reducing the amount in the first player's maintained recent play meter by fifty units every second until the first player places another wager. Thus, at a third point in time 224 which is thirteen seconds past the first point in time, four recent pool reduction events have occurred, the first player's maintained recent play meter has been reduced two-hundred units to leave a balance of fifty units and the first player's maintained total play meter has a balance of two-hundred-fifty units.

Continuing with this illustrated example, at a fourth point in time 226 which occurs one minute after the first point in time, the first player has wagered one-thousand credits (i.e., four bets of two-hundred-fifty credits each in this one minute). At this fourth point in time, the gaming system has caused four accumulated wager meter increment events to occur, increased the player's maintained total play meter and maintained recent play meter by one-thousand units each and reduced the first player's recent play meter by eight-hundred units (i.e., sixteen separate occurrences of one second intervals after ten seconds without a bet in this one minute). Thus, in the example, at this fourth point in time (i.e., for this one minute of gaming), the first player's maintained total play meter has a balance of one-thousand units and the first player's maintained recent play meter has a balance of two-hundred units.

As also seen in FIG. 8, upon a second player (e.g., Player B) placing a wager of one-hundred-sixty-five credits (i.e., an occurrence of an accumulated wager meter increment event) at the first point in time 220, the gaming system increases the maintained total play meter and the maintained recent play meter for the second player by one-hundred-sixty-five credits or units. In this example, if the second player is betting one-hundred-sixty-five credits every ten seconds and a player's recent play meter is reduced by fifty units every second after ten seconds without placing a wager (i.e., an occurrence of a recent play meter reduction event), then at the second point in time 222 that is ten seconds after the first point in time, the second player places another wager of one-hundred-sixty-five credits (i.e., another occurrence of an accumulated wager meter increment event) and the gaming system increases the maintained total play meter and the maintained recent play meter for the first player by another one-hundred-sixty-five units. It should be appreciated that since the second player is placing wagers at such a frequency, no recent play meter reduction events occur in association with the second player's wagering activity. Accordingly, at the second point in time, the maintained total play meter and the maintained recent play meter for the first player each include three-hundred-thirty units.

Continuing with this illustrated example, at the fourth point in time 226 which occurs one minute after the first point in time, the second player has wagered nine-hundred-ninety credits (i.e., six bets of one-hundred-sixty-five credits each in this one minute). At this fourth point in time, the gaming system has caused six accumulated wager meter increment events to occur, increased the player's maintained total play meter and maintained recent play meter by nine-hundred-ninety units each and reduced the second player's recent play meter by zero units (i.e., zero separate occurrences of one second intervals after ten seconds without a bet in this one minute). Thus, in the example, at this fourth point in time (i.e., for this one minute of gaming), the second player's maintained total play meter has a balance of nine-hundred-ninety units and the second player's maintained recent play meter has a balance of nine-hundred-ninety units.

It should be appreciated that in this example, despite the first player wagering a higher amount per wager placed, the second player's frequency in placing wagers of a lower amount per wager results in the second player having a greater recent play meter after a period of time. Accordingly, the gaming system disclosed herein maintains different amounts in different player's maintained recent play meters based on each player's respective amounts wagered and frequency of placing such wagers.

In one embodiment, in addition to maintaining a total play meter and a recent play meter for the players at the gaming devices, the gaming system also determines if a bonus event triggering condition occurs as indicated in block 208 of FIG. 7. In one embodiment, a bonus event triggering condition occurs based on a displayed event in a play of one or more displayed games of one or more of the gaming devices in the gaming system. For example, a bonus event triggering condition occurs if a designated symbol or symbol combination is generated in a play of a primary game. In another embodiment, a bonus event triggering condition occurs independent of any displayed event in any play of any game of any of the gaming devices in the gaming system. In another embodiment, the gaming system tracks the occurrences of one or more suitable events occurring at or in association with one or more players and/or one or more gaming devices in the gaming system and determines, based on these tracked events, whether a bonus event triggering condition has occurred. In another embodiment, the gaming system defines one or more game play parameters, wherein each time a player's tracked game play activity satisfies the defined parameter, a bonus event triggering condition occurs.

In one embodiment, if the bonus event triggering condition has not occurred, the gaming system returns to block 202 and continues maintaining, for each player, a total play accumulated wager meter and a recent play accumulated wager meter until another occurrence of an accumulated wager meter increment event or a recent play meter reduction event.

On the other hand, if the bonus event triggering condition occurs, the gaming system utilizes the maintained recent play meter for the player to determine that player's probability of winning a group bonus event award for the triggered bonus event as indicated in block 210. As described above, in different embodiment, the gaming system employs one or more methods to determine which players qualify to participate for the triggered bonus event.

In one embodiment, the greater the amount in a player's maintained recent play meter, the greater that player's probability of winning a group bonus event award for the triggered bonus event. That is, the gaming system determines each player's probability of success of winning a group bonus event award in the triggered bonus event, wherein each player's determined probability of success is based on the current amount in that player's maintained recent player pool (which is based on that player's wagers placed and frequency of placing such wagers). Accordingly, if a first player is placing wagers at a quicker rate than a second player (that has been placing wagers for a longer period of time), the gaming system maintains a greater recent play meter for the first player than the recent play meter for the second player. Thus, this configuration provides that the gaming system determines that the first player will have a greater probability of winning a group bonus event award than the second player (i.e., based on the first player having a greater recent play meter).

In one embodiment, to determine each player's relative probability of winning a group bonus event award for the triggered bonus event, the gaming system determines the total amount of units accumulated in the maintained recent play meters for the players that qualify to participate in the triggered bonus event. In this embodiment, the gaming system then determines, for each of such players, that player's relative probability of winning a group bonus event award for the triggered bonus event based on that player's relative contribution to this determined total amount of units. For example, as seen in FIG. 9 and following the example described above in FIG. 8, if the gaming system determines that five players (i.e., Player A, Player B, Player C, Player D and Player E) each qualify to participate in the triggered bonus event, the gaming system determines that the total amounts in these five player's maintained recent play meters is three-thousand units. Accordingly, for Player A, the gaming system determines that Player A contributed two-hundred units to this determined total of three-thousand units and thus Player A's relative probability of winning a group bonus event award for the triggered bonus event is 7% (or 200/3000). Similarly, for Player B, the gaming system determines that Player B contributed nine-hundred-ninety units to this determined total of three-thousand units and thus Player B's relative probability of winning a group bonus event award for the triggered bonus event is 33% (or 990/3000).

Moreover, if the bonus event triggering condition occurs, as indicated in block 212 of FIG. 7, the gaming system utilizes the maintained total play meter for a player to determine an applicable multiplier for that player for the triggered bonus event. In one such embodiment, the greater the amount in a player's maintained total play meter, the greater the determined applicable multiplier for that player. For example, as seen in FIG. 9 and following the example described above in FIG. 8, the gaming system determines that since Player A and Player B each had substantially the same amount in each player's total play meter, the gaming system determines an applicable multiplier of 10× for both Player A and Player B.

After determining each player's applicable multiplier and each player's relative probability of winning a group bonus event award in the triggered bonus event, the gaming system determines an individual group bonus event award for each player as indicated in block 214. In this embodiment, the determined individual group bonus event award for each player is based, at least in part, on the determined applicable multiplier for that player. In one such embodiment, the bonus event is a free spins bonus event, wherein the gaming system provides each participating player a quantity of free spin. In this embodiment, any determined award for each free spin is modified by the determined applicable multiplier for that player, wherein the modified awards from the quantity of free spins provided to the player forms the individual group bonus event award for that player.

As indicated in block 216, the gaming system also selects one of the players to provide a group bonus event award, wherein the selection is based on the determined relative probabilities. The gaming system then displays the triggered bonus event, provides any determined individual group bonus event awards and provides the group bonus event award to the selected player as indicated in block 218. Accordingly, this embodiment provides that the gaming system maintains different recent play meters for different players that are wagering different amounts at different rates. Such different maintained recent play meters correspond to different probabilities of winning a group bonus event award proportional to each individual player's wagering activity for a period of time.

In one embodiment, the triggered bonus event is a competitive bonus event. In one such embodiment, if the bonus event triggering condition occurs, the gaming system utilizes the maintained recent play meter for the player to determine that player's relative starting position for the triggered bonus event and further utilizes the maintained total play meter for the player to determine that player's relative probability of winning the group bonus event award. In another such embodiment, if the bonus event triggering condition occurs, the gaming system utilizes the maintained recent play meter for the player to determine that player's relative probability of winning the group bonus event award and further utilizes the maintained total play meter for the player to determine that player's relative starting position for the triggered bonus event.

In another embodiment, the triggered bonus event is a competitive bonus event, wherein if the bonus event triggering condition occurs, the gaming system utilizes the maintained recent play meter for the player to determine that player's relative starting position for the triggered bonus event. In this embodiment, the gaming system further utilizes the maintained total play meter for the player to determine if that player is eligible to participate in the triggered group bonus event. In another such embodiment, if the bonus event triggering condition occurs, the gaming system utilizes the maintained recent play meter for the player to determine if that player is eligible to participate in the triggered group bonus event and further utilizes the maintained total play meter for the player to determine that player's relative starting position for the triggered bonus event.

In one embodiment, the gaming system utilizes the maintained recent play meter for the player to determine which of a plurality of tiered progressive awards the play may win during the triggered bonus event and further utilizes the maintained total play meter for the player to determine that player's relative probability of winning the determined progressive award as a group bonus event award. In another such embodiment, the gaming system utilizes the maintained total play meter for the player to determine which of a plurality of tiered progressive awards the play may win during the triggered bonus event and further utilizes the maintained recent play meter for the player to determine that player's relative probability of winning the determined progressive award as a group bonus event award.

In one embodiment, an accumulated wager meter increment event occurs if a player places a wager, such as a primary game wager or a side wager, that is at least a designated amount. In another embodiment, an accumulated wager meter increment event occurs if a player places at least a designated amount of wagers over a designated period of time (i.e., a player's coin-in for a designated period of time reaches an accumulated wager meter increment event threshold).

In another embodiment, an accumulated wager meter increment event occurs based on a displayed event in a play of one or more displayed games of one or more of the gaming devices in the gaming system. In another embodiment, an accumulated wager meter increment event occurs independent of any displayed event in any play of any game of any of the gaming devices in the gaming system. In another embodiment, the gaming system tracks the occurrences of one or more suitable events occurring at or in association with one or more players and/or one or more gaming devices in the gaming system and determines, based on these tracked events, whether an accumulated wager meter increment event has occurred. In another embodiment, the gaming system defines one or more game play parameters, wherein each time a player's tracked game play activity satisfies the defined parameter, an accumulated wager meter increment event occurs. In another embodiment, an accumulated wager meter increment event occurs if a player wagers at least a designated amount over a designated amount of time (i.e., the player is playing at at least a certain rate). In different embodiments, the determination of whether an accumulated wager meter increment event occurs is predetermined, randomly determined, determined based on a player's status (such as determined through a player tracking system), determined based on a generated symbol or symbol combination, determined based on a random determination by the central controller, determined based on a random determination at the gaming machine, determined based on time (such as the time of day), determined based on an amount of coin-in accumulated in one or more pools or determined based on any other suitable method or criteria.

In one embodiment, an accumulated wager meter increment event occurs during a player's play of a primary wagering game. In another embodiment, an accumulated wager meter increment event occurs during a player's play of a primary wagering game or during a player's play of a triggered bonus event. In this embodiment, the gaming system enables a player's accumulated wager meters to increase during the player's participation in the triggered bonus event wherein such accumulated bonus event points may increase the player's probability of winning a group bonus event award.

In one embodiment, if an accumulated wager meter increment event occurs, the amount of credits or units accumulated in a player's maintained recent play meter and/or maintained total play meter is based on a displayed event in a play of one or more displayed games of one or more of the gaming devices in the gaming system. In another embodiment, if an accumulated wager meter increment event occurs, the amount of credits or units accumulated in a player's maintained recent play meter and/or maintained total play meter is independent of any displayed event in any play of any game of any of the gaming devices in the gaming system. In different embodiments, if an accumulated wager meter increment event occurs, the amount of credits or units accumulated in a player's maintained recent play meter and/or maintained total play meter is predetermined, randomly determined, determined based on a player's status (such as determined through a player tracking system), determined based on a generated symbol or symbol combination, determined based on a random determination by the central controller, determined based on a random determination at the gaming machine, determined based on time (such as the time of day), determined based on an amount of coin-in accumulated in one or more pools or determined based on any other suitable method or criteria.

In one embodiment if an accumulated wager meter increment event occurs, the amount of credits or units accumulated in a maintained recent play meter and/or maintained total play meter are for the specific player at the gaming device associated with the accumulated wager meter increment event. In this embodiment, as described herein, such maintained recent play meters and/or total play meters are associated with the player and may be transferred from gaming device to gaming device. In one such embodiment, the amount of credits or units accumulated in a maintained recent play meter for the player and/or a maintained total play meter for the player are stored in association with the player's identification card or player tracking card. In another such embodiment, the amount of credits or units accumulated in a maintained recent play meter for the player and/or a maintained total play meter for the player are stored in association with a ticket or voucher. In this embodiment, if the player inserts the ticket or voucher into the note, ticket or bill acceptor of one of the gaming devices in the gaming system, that gaming device reads the ticket or voucher and enables the player to access the maintained recent play meter for that player and/or the maintained for that player. Such embodiments enable the player to access any stored amounts of credits or units accumulated in a maintained recent play meter and/or maintained total play meter and accumulate additional amounts of credits or units in such maintained recent play meter and/or maintained total play meter at a plurality of different gaming devices.

In another embodiment, if an accumulated wager meter increment event occurs, the amount of credits or units accumulated in a maintained recent play meter and/or maintained total play meter are for the gaming device associated with the accumulated wager meter increment event. In this embodiment, if a recent play meter reduction event occurs, the amount of credits or units reduced from the maintained recent play meter are for the gaming device associated with the accumulated wager meter increment event. That is, icy this embodiment, such maintained recent play meters and/or total play meters are associated with the gaming device and independent of which player may be playing the gaming device at any given point in time.

In another embodiment, a recent play meter reduction event occurs based on a displayed event in a play of one or more displayed games of one or more of the gaming devices in the gaming system. In another embodiment, a recent play meter reduction event occurs independent of any displayed event in any play of any game of any of the gaming devices in the gaming system. In another embodiment, the gaming system tracks the occurrences of one or more suitable events occurring at or in association with one or more players and/or one or more gaming devices in the gaming system and determines, based on these tracked events, whether a recent play meter reduction event has occurred. In another embodiment, the gaming system defines one or more game play parameters, wherein each time a player's tracked game play activity satisfies the defined parameter, a recent play meter reduction event occurs. In different embodiments, the determination of whether a recent play meter reduction event occurs is predetermined, randomly determined, determined based on a player's status (such as determined through a player tracking system), determined based on a generated symbol or symbol combination, determined based on a random determination by the central controller, determined based on a random determination at the gaming machine, determined based on one or more side wagers placed, determined based on the player's primary game wager, determined based on time (such as the time of day), determined based on an amount of coin-in accumulated in one or more pools or determined based on any other suitable method or criteria.

In another embodiment, an occurrence of an accumulated wager meter increment event for one player corresponds to an occurrence of a recent play meter reduction event for at least another player at another gaming device in the gaming system. In one such embodiment, every wager placed by a first player causes an accumulated wager meter increment event for that first player and a recent play meter reduction event for at least a second player and every wager placed by the second player causes an accumulated wager meter increment event for the second player and causes a recent play meter reduction event for at least the first player.

In one embodiment, if a recent play meter reduction event occurs in association with a player, the amount that player's recent play meter is reduced is based on that player's current wager. In another embodiment, if a recent play meter reduction event occurs in association with a player, the amount that player's recent play meter is reduced is based on that player's wagers over a designated period of time. In one embodiment, for different players wagering different amounts, the gaming system causes one or more recent play meter reduction events to occur for such different players at the same rates of occurrence. In another embodiment, for different players wagering different amounts, the gaming system causes one or more recent play meter reduction events to occur for such different players at different rates of occurrence. In another embodiment, for different players wagering different amounts, upon an occurrence of a recent play meter reduction event, the gaming system reduces each player's recent play meter by the same amount. In another embodiment, for different players wagering different amounts, upon an occurrence of a recent play meter reduction event, the gaming system reduces each player's recent play meter by different amounts.

In one embodiment, for different players of different player tracking statuses, the gaming system causes one or more recent play meter reduction events to occur for such different players at the same rates of occurrence. In another embodiment, for different players of different player tracking statuses, the gaming system causes one or more recent play meter reduction events to occur for such different players at different rates of occurrence. In another embodiment, for different players of different player tracking statuses, upon an occurrence of a recent play meter reduction event, the gaming system reduces each player's recent play meter by the same amount. In another embodiment, for different players of different player tracking statuses, upon an occurrence of a recent play meter reduction event, the gaming system reduces each player's recent play meter by different amounts.

In another embodiment, if a recent play meter reduction event occurs in association with a player, the gaming system causes the player to lose or forfeit a predetermined percentage of that player's recent play accumulated wager meter. For example, every ten seconds that occurs without a player placing a wager, a recent play meter reduction event occurs and the player forfeits 90% of their recent play meter. In another example, every three seconds that occurs without a player placing a wager, a recent play meter reduction event occurs and the player forfeits 10% of their recent play meter. In another embodiment, the greater the amount tracked in a player's recent play meter, the greater the percentage of that player's recent play meter that is forfeited with each occurrence of a recent play meter reduction event. In another embodiment, the greater the amount tracked in a player's recent play meter, the lower the percentage of that player's recent play meter that is forfeited with each occurrence of a recent play meter reduction event. In different embodiments, for one or more occurrences of a recent play meter reduction event, the percentage of a player's recent play meter that the gaming system causes to be forfeited is predetermined, randomly determined, determined based on the player's status (such as determined through a player tracking system), determined based on a generated symbol or symbol combination, determined based on a random determination by the central controller, determined based on a random determination at the gaming machine, determined based on one or more side wagers placed, determined based on the player's primary game wager, determined based on time (such as the time of day), determined based on an amount of coin-in accumulated in one or more pools or determined based on any other suitable method or criteria.

In another embodiment, if a recent play meter reduction event occurs in association with a player, the gaming system causes the player to lose or forfeit a designated amount from their maintained recent play meter. In one such embodiment, this designated amount is the entire amount currently in the recent play meter. In another embodiment, the greater the amount tracked in a player's recent play meter, the greater the designated amount that is forfeited with each occurrence of a recent play meter reduction event. In another embodiment, the greater the amount tracked in a player's recent play meter, the lower the designated amount that is forfeited with each occurrence of a recent play meter reduction event. In different embodiments, for one or more occurrences of a recent play meter reduction event, the designated amount of the recent play meter forfeited by the player is predetermined, randomly determined, determined based on the player's status (such as determined through a player tracking system), determined based on a generated symbol or symbol combination, determined based on a random determination by the central controller, determined based on a random determination at the gaming machine, determined based on one or more side wagers placed, determined based on the player's primary game wager, determined based on time (such as the time of day), determined based on an amount of coin-in accumulated in one or more pools or determined based on any other suitable method or criteria.

In one embodiment, a recent play meter reduction event does not occur if the player is viewing one or more help screens displayed by the gaming device and/or a designated amount of credits are currently on the gaming device. In another embodiment, a modified recent play meter reduction event occurs (which reduces the player's recent play meter by a lower amount than other recent play meter reduction events occurring) if the player is viewing one or more help screens displayed by the gaming device and/or a designated amount of credits are currently on the gaming device. In another embodiment, a recent play meter reduction event occurs less frequently (e.g., every thirty seconds without the player placing any wagers compared to every ten seconds of other recent play meter reduction events) if the player is viewing one or more help screens displayed by the gaming device and/or a designated amount of credits are currently on the gaming device.

In one embodiment, if a player at a gaming device wins a play of a game and is provided an award, a recent play meter reduction event does not occur during the period of time which the credit meter increments to reflect this provided award. In another embodiment, if a player at a gaming device wins a play of a game and is provided an award, a modified recent play meter reduction event occurs (which reduces the player's recent play meter by a lower amount than other recent play meter reduction events occurring). In another embodiment, if a player at a gaming device wins a play of a game and is provided an award, a recent play meter reduction event occurs less frequently.

In one embodiment, to determine each player's relative probability of winning a group bonus event award for the triggered bonus event, the gaming system utilizes that player's current recent play accumulated wager meter and one or more factors related to that player's action, performance or other gaming experience. In one such embodiment, the gaming system determines each player's relative probability of winning a group bonus event award for the triggered bonus event based on that player's current recent play accumulated wager meter and that player's current wager. In another such embodiment, the gaming system determines each player's relative probability of winning a group bonus event award for the triggered bonus event based on that player's current recent play accumulated wager meter and that player's player tracking status. In different embodiments, the gaming system determines each player's relative probability of winning a group bonus event award for the triggered bonus event based on that player's current recent play accumulated wager meter and at least one determination which is predetermined, randomly determined, determined based on a generated symbol or symbol combination, determined based on a random determination by the central controller, determined based on a random determination at the gaming machine, determined based on one or more side wagers placed, determined based on time (such as the time of day), determined based on an amount of coin-in accumulated in one or more pools or determined based on any other suitable method or criteria.

In different embodiments of the gaming system disclosed herein, (i) a bonus event point accumulation event occurs, (ii) a bonus event point reduction event occurs, (iii) a bonus event triggering event occurs, (iv) an accumulated wager meter increment event occurs, and/or (v) a recent play meter reduction event occurs based on an amount coin-in. In this embodiment, the gaming system determines if an amount of coin-in wagered at one or more gaming devices in the gaming system reaches or exceeds a designated amount of coin-in (i.e., a threshold coin-in amount). Upon the amount of coin-in wagered at one or more gaming devices in the gaming system reaching or exceeding the bonus threshold coin-in amount, the gaming system causes one or more of such events or conditions to occur. In different embodiments, the threshold coin-in amount is predetermined, randomly determined, determined based on a player's status (such as determined through a player tracking system), determined based on a generated symbol or symbol combination, determined based on a random determination by the central controller, determined based on a random determination at the gaming machine, determined based on one or more side wagers placed, determined based on the player's primary game wager, determined based on time (such as the time of day) or determined based on any other suitable method or criteria.

In different embodiments of the gaming system disclosed herein, (i) a bonus event point accumulation event occurs, a bonus event point reduction event occurs, (iii) a bonus event triggering event occurs, (iv) an accumulated wager meter increment event occurs, and/or (v) a recent play meter reduction event occurs on an amount coin-out. In this embodiment, the gaming system determines if an amount of coin-out provided by one or more gaming devices in the gaming system reaches or exceeds a designated amount of coin-out (i.e., a threshold coin-out amount). Upon the amount of coin-out provided at one or more gaming devices in the gaming system reaching or exceeding the threshold coin-out amount, the gaming system causes one or more of such events or conditions to occur. In different embodiments, the threshold coin-out amount is predetermined, randomly determined, determined based on a player's status (such as determined through a player tracking system), determined based on a generated symbol or symbol combination, determined based on a random determination by the central controller, determined based on a random determination at the gaming machine, determined based on one or more side wagers placed, determined based on the player's primary game wager, determined based on time (such as the time of day) or determined based on any other suitable method or criteria.

In different embodiments of the gaming system disclosed herein, (i) a bonus event point accumulation event occurs, (ii) a bonus event point reduction event occurs, (iii) a bonus event triggering event occurs, (iv) an accumulated wager meter increment event occurs, and/or (v) a recent play meter reduction event occurs based on a predefined variable reaching a defined parameter threshold. For example, when the 500,000th player has played a gaming machine of the gaming system (ascertained from a player tracking system), one or more of such events or conditions occur. In different embodiments, the predefined parameter thresholds include a length of time, a length of time after a certain dollar amount is hit, a wager level threshold for a specific machine (which gaming device is the first to contribute $250,000), a number of gaming machines active, or any other parameter that defines a suitable threshold.

In different embodiments of the gaming system disclosed herein, (i) a bonus event points accumulation event occurs, (ii) a bonus event point reduction event occurs, (iii) a bonus event triggering event occurs, (iv) an accumulated wager meter increment event occurs, and/or (v) a recent play meter reduction event occurs based on time. In this embodiment, a time is set for when one or more of such events or conditions will occur. In one embodiment, such a set time is based on historic data.

In different embodiments of the gaming system disclosed herein, (i) a bonus event point accumulation event occurs, (ii) a bonus event point reduction event occurs, (iii) a bonus event triggering event occurs, (iv) an accumulated wager meter increment event occurs, and/or (v) a recent play meter reduction event occurs based upon gaming system operator defined player eligibility parameters stored on a player tracking system (such as via a player tracking card or other suitable manner). In this embodiment, the parameters for eligibility are defined by the gaming system operator based on any suitable criterion. In one embodiment, the central controller/gaming device processor recognizes the player's identification (via the player tracking system) when the player inserts or otherwise associates their player tracking card in the gaming machine. The central server/gaming device processor determines the player tracking level of the player and if the current player tracking level defined by the gaming system operator is eligible for one or more of such events or conditions. In one embodiment, the gaming system operator defines minimum bet levels required for such events or conditions to occur based on the player's card level.

In different embodiments of the gaming system disclosed herein, (i) a bonus event point accumulation event occurs, (ii) a bonus event point reduction event occurs, (iii) a bonus event triggering event occurs, (iv) an accumulated wager meter increment event occurs, and/or (v) a recent play meter reduction event occurs based on a system determination, including one or more random selections by the central controller. In one embodiment, as described above, the central controller tracks all active gaming machines and the wagers they placed. Each gaming machine has its own entry defining its state as either active or inactive and also defining the values of the wagers from that gaming machine. In one embodiment, active status means that the gaming machine is being actively played by a player and enrolled/inactive status means that the gaming machine is not being actively played by a player. The active status requirements can be based on any suitable number of satisfied criteria or defined in any suitable manner by the implementer of the gaming system. In one such embodiment, based on the gaming machine's state as well as one or more wager pools associated with the gaming machine, the central controller determines whether to one or more of such events or conditions will occur. In one such embodiment, the player who consistently places a higher wager is more likely to be associated with an occurrence of one or more of such events or conditions than a player who consistently places a minimum wager. It should be appreciated that the criteria for determining whether a player is in active status or inactive status for determining if one or more of such events occur may the same as, substantially the same as, or different than the criteria for determining whether a player is in active status or inactive status for another one of such events to occur.

In different embodiments of the gaming system disclosed herein, (i) a bonus event point accumulation event occurs, (ii) a bonus event point reduction event occurs, (iii) a bonus event triggering event occurs, (iv) an accumulated wager meter increment event occurs, and/or (v) a recent play meter reduction event occurs based on a determination of if any numbers allotted to a gaming device match a randomly selected number. In this embodiment, upon or prior to each play of each gaming machine, a gaming device selects a random number from a range of numbers and during each primary game, the gaming machine allocates the first N numbers in the range, where N is the number of credits bet by the player in that primary game. At the end of the primary game, the randomly selected number is compared with the numbers allocated to the player and if a match occurs, one or more of such events or conditions occur. It should be appreciated that any suitable manner of causing one or more bonus event elements to be provided may be implemented in accordance with the gaming system and method disclosed herein.

In one embodiment, as described above, the gaming system enables a plurality of players at a plurality of linked gaming devices to participate in a group gaming environment. In one embodiment, the gaming system enables a plurality of players at a plurality of linked gaming devices to work in conjunction with one another, such as playing together as a team or group, to win one or more group bonus event awards. In one embodiment, the gaming system enables a plurality of players at a plurality of linked gaming devices to compete against one another for one or more group bonus event awards. In one such embodiment, the gaming system enables a plurality of players at a plurality of linked gaming devices to participate in a gaming tournament for one or more group bonus event awards. In another embodiment, the gaming system enables a plurality of players at a plurality of linked gaming devices to play for one or more group bonus event awards wherein an outcome generated by one gaming device affects the outcomes generated by one or more linked gaming devices. In another embodiment, any group bonus event award won by the group is shared, either equally or based on any suitable criteria, amongst the different players of the group.

Information Provided to Player

As indicated above, the bonus event points accumulation events, the bonus event point reduction events, the bonus event triggering events, the accumulated wager meter increment events, and/or the recent play meter reduction events may be provided to the players of the gaming machines with or without explanation or information provided to the player, or alternatively information can be displayed to the player. In one embodiment, suitable information about these events or conditions can be provided to the players through one or more displays on the gaming machines or additional information displays positioned near the gaming machines, such as above a bank of system gaming machines.

This information can be used to entertain the player or inform the player that one or more of such events or conditions has occurred or will occur. Examples of such information, include, but are not limited to:

(1) that a bonus event points accumulation event, a bonus event point reduction event, a bonus event triggering event, an accumulated wager meter increment event, and/or a recent play meter reduction event has occurred;

(2) that a bonus event points accumulation event, a bonus event point reduction event, a bonus event triggering event, an accumulated wager meter increment event, and/or a recent play meter reduction event will shortly occur;

(3) that one or more bonus event points and/or group bonus event awards have been provided to one or more players;

(4) an amount accounted for in each player's recent play accumulated wager meter and/or total play accumulated wager meter;

(5) which gaming machines have won the bonus event points or group bonus event awards;

(6) the amount of the provided bonus event points or group bonus event awards;

(7) the highest group bonus event award or quantity of bonus event points provided;

(8) the lowest group bonus event award or quantity of bonus event elements provided;

(9) the average group bonus event award or quantity of bonus event points provided;

(10) number of games played/total time since the last group bonus event award or quantity of bonus event points were provided;

(11) the average time between group bonus event awards or quantity of bonus event points being provided;

(12) the number of group bonus event awards or bonus event points provided in a designated time period; and

(13) the amount of the group bonus event awards or quantities of bonus event points that can be provided.

It should be appreciated that such information can be provided to the players through any suitable audio, audio-visual or visual devices.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

The invention is claimed as follows:

1. A gaming system comprising:

a plurality of gaming devices, each gaming device including a plurality of input devices including:

(i) an acceptor, and (ii) a cashout device;

at least one processor; and at least one memory device which stores a plurality of instructions, which when executed by the at least one processor, cause the at least one processor to operate with the plurality of input devices to:

(a) if a physical item is received via the acceptor, establish a credit balance based, at least in part, on a monetary value associated with the received physical item, (b) receive at least one wager on at least one play of at least one wagering game, and (c) if a cashout input is received via the cashout device, cause an initiation of any payout associated with the credit balance;

at least one display device associated with at least one of said gaming devices; and at least one controller configured to operate with each of said gaming devices and said at least one display device to:

(a) for each player at each of said gaming devices:

(i) maintain a total play accumulated wager amount meter and a distinct recent play accumulated wager amount meter, (i) upon an occurrence of an accumulated wager amount meter increment event, accumulate a first amount in the maintained total play accumulated wager amount meter and the maintained recent play accumulated wager amount meter, and (ii) upon an occurrence of a recent play meter reduction event, reduce the maintained recent play accumulated wager amount meter by a second amount; and (b) upon an occurrence of a group bonus event triggering condition:

for each player:

(A) determine a modifier for the triggered group bonus event, wherein said determined modifier is based on the current amount in the total play accumulated wager amount meter maintained for said player, (B) determine an individual bonus event award for the triggered group bonus event, said determined individual bonus event award based, at least in part, on the determined modifier for the triggered group bonus event, and (C) cause said determined individual bonus event award to be displayed and provided to the player of said gaming device;

(ii) select one of the players to win the triggered bonus event, wherein said selection is based, at least in part, on the current amounts in the recent play accumulated wager amount meters maintained for the players; and (iii) cause a bonus event award to be displayed and provided to the player selected to win the triggered bonus event.

2. The gaming system of claim 1, wherein said accumulated wager amount meter increment event occurs for each gaming device based on the player at said gaming device placing a wager.

3. The gaming system of claim 1, wherein said accumulated wager amount meter increment event occurs for each gaming device based on the player at said gaming device placing a designated amount of wagers for a designated period of time.

4. The gaming system of claim 1, wherein said recent play meter reduction event occurs based on a designated amount of time.

5. The gaming system of claim 1, wherein said recent play meter reduction event occurs for each gaming device based on the player at said gaming device not placing any wager within a designated amount of time.

6. The gaming system of claim 1, wherein second reduced amount in the maintained recent play accumulated wager amount meter is a percentage of the current amount in the maintained recent play accumulated wager amount meter.

7. The gaming system of claim 1, wherein the group bonus event award is one of a plurality of progressive awards.

8. The gaming system of claim 7, wherein the at least one controller is configured to select one of the progressive awards to provide as the group bonus event award based on the current amount in the recent play accumulated wager amount meter maintained for the player determined to win the triggered group bonus event.

9. The gaming system of claim 1, wherein said second reduced amount in the maintained recent play accumulated wager amount meter is less than the first accumulated amount in the maintained recent play accumulated wager amount meter.

10. A method of operating a gaming system, said method comprising:

(a) for each player at each of a plurality of gaming devices:

(i) causing at least one controller to maintain a total play accumulated wager amount meter and a distinct recent play accumulated wager amount meter, upon an occurrence of an accumulated wager amount meter increment event, causing the at least one controller to accumulate a first amount in the maintained total play accumulated wager amount meter and the maintained recent play accumulated wager amount meter, and (ii) upon an occurrence of a recent play meter reduction event, causing the at least one controller to reduce the maintained recent play accumulated wager amount meter by a second amount; and (b) upon an occurrence of a group bonus event triggering condition:

for each player:

(A) causing the at least one controller to determine a modifier for the triggered group bonus event, wherein said determined modifier is based on the current amount in the total play accumulated wager amount meter maintained for said player, (B) causing the at least one controller to determine an individual bonus event award for the triggered group bonus event, said determined individual bonus event award based, at least in part, on the determined modifier for the triggered group bonus event, and (C) causing said determined individual bonus event award to be displayed and provided to the player of said gaming device, wherein a credit balance of said gaming device is increasable based on the provided individual bonus event award, said credit balance being increasable via an acceptor of a physical item associated with a monetary value, and said credit balance being decreasable via a cashout device;

(ii) causing the at least one controller to select one of the players to win the triggered bonus event, wherein said selection is based, at least in part, on the current amounts in the recent play accumulated wager amount meters maintained for the players; and (iii) causing a bonus event award to be displayed and provided to the player selected to win the triggered bonus event.

11. The method of claim 10, wherein said accumulated wager amount meter increment event occurs for each gaming device based on the player at said gaming device placing a wager.

12. The method of claim 10, wherein said accumulated wager amount meter increment event occurs for each gaming device based on the player at said gaming device placing a designated amount of wagers for a designated period of time.

13. The method of claim 10, wherein said recent play meter reduction event occurs based on a designated amount of time.

14. The method of claim 10, wherein said recent play meter reduction event occurs for each gaming device based on the player at said gaming device not placing any wager within a designated amount of time.

15. The method of claim 10, wherein second reduced amount in the maintained recent play accumulated wager amount meter is a percentage of the current amount in the maintained recent play accumulated wager amount meter.

16. The method of claim 10, wherein the group bonus event award is one of a plurality of progressive awards.

17. The method of claim 16, which includes causing the at least one controller to select one of the progressive awards to provide as the group bonus event award based on the current amount in the recent play accumulated wager amount meter maintained for the player determined to win the triggered group bonus event.

18. The method of claim 10, wherein said second reduced amount in the maintained recent play accumulated wager amount meter is less than the first accumulated amount in the maintained recent play accumulated wager amount meter.

19. The method of claim 10, which is executed through a data network.

20. The method of claim 19, wherein the data network is an internet.

* * * * *